(12) United States Patent
Monden et al.

(10) Patent No.: US 6,466,421 B1
(45) Date of Patent: Oct. 15, 2002

(54) SOLID ELECTROLYTIC CAPACITOR AND METHOD FOR PRODUCING THE SAME

(75) Inventors: Ryuji Monden; Atsushi Sakai; Toru Sawaguchi, all of Nagano; Hideki Ohata; Koro Shirane, both of Chiba; Hiroshi Konuma, Saitama; Yuji Furuta; Katsuhiko Yamazaki, both of Nagano; Yoshiaki Ikenoue, Tokyo, all of (JP)

(73) Assignee: Showa Denko K.K., Tokyo (JP)

( * ) Notice: Subject to any disclaimer, the term of this patent is extended or adjusted under 35 U.S.C. 154(b) by 0 days.

(21) Appl. No.: 09/487,329

(22) Filed: Jan. 19, 2000

Related U.S. Application Data

(63) Continuation-in-part of application No. 09/369,419, filed on Aug. 6, 1999, now Pat. No. 6,344,966, and a continuation-in-part of application No. PCT/JP99/02647, filed on May 20, 1999

(60) Provisional application No. 60/123,985, filed on Mar. 11, 1999, and provisional application No. 60/123,986, filed on Mar. 11, 1999.

(30) Foreign Application Priority Data

| May 21, 1998 | (JP) | 10-140062 |
| Sep. 8, 1998 | (JP) | 10-253644 |

(51) Int. Cl.$^7$ .................................................. H01G 2/00
(52) U.S. Cl. ............................ 361/15; 361/58; 361/115
(58) Field of Search .............................. 361/15, 115, 58

(56) References Cited

U.S. PATENT DOCUMENTS

| 4,780,796 A | 10/1988 | Fukuda et al. .............. 361/433 |
| 4,803,596 A | 2/1989 | Hellwig et al. .............. 361/525 |
| 4,910,645 A | 3/1990 | Jonas et al. .................. 361/525 |
| 4,959,753 A | 9/1990 | Kudoh et al. ................. 361/525 |
| 5,455,736 A | 10/1995 | Nishiyama et al. ......... 361/525 |
| 5,473,503 A | 12/1995 | Sakata et al. ................ 361/525 |

FOREIGN PATENT DOCUMENTS

| EP | 0 652 576 A2 | 5/1995 | ........... H01G/9/028 |
| EP | 0 820 076 A2 | 1/1998 | ........... H01G/9/025 |
| EP | 0 825 626 A2 | 2/1998 | ............ H01G/9/15 |
| JP | 79424 | 10/1961 | ............ H01G/9/02 |
| JP | 61-239617 | 10/1986 | ............ H01G/9/02 |
| JP | 61/240625 | 10/1986 | ............ H01G/9/02 |
| JP | 62-118509 | 5/1987 | ............ H01G/9/02 |
| JP | 62-118511 | 5/1987 | ............ H01G/9/24 |
| JP | 63-118323 | 5/1988 | ........... C08G/61/12 |
| JP | 2-242816 | 9/1990 | ............ C08G/6/12 |
| JP | 5-175082 | 7/1993 | ............ H01G/9/02 |
| JP | 8-53566 | 2/1996 | .............. C08J/9/28 |
| JP | 9-320901 | 12/1997 | ........... H01G/9/028 |
| JP | 10-32145 | 2/1998 | ........... H01G/9/028 |

Primary Examiner—Stephen W. Jackson
(74) Attorney, Agent, or Firm—Sughrue Mion, PLLC

(57) ABSTRACT

Disclosed are a solid electrolytic capacitor comprising a valve-acting metal, an oxide dielectric layer formed on a surface of the valve-acting metal and a solid electrolyte layer provided on the dielectric film layer, in which the electrically conducting polymer composition layer contains as a dopant at least one anion selected from (1) an alkoxy-substituted naphthalene monosulfonate anion, (2) a heterocyclic sulfonate anion, and (3) an anion of an aliphatic polycyclic compound or a combination thereof with another anion having a dopant ability and a method for producing such a solid electrolytic capacitor.

The solid electrolytic capacitor of the invention is excellent in voltage resistance, high frequency property, tan δ, leakage current, heat resistance (reflow property), etc.

24 Claims, 2 Drawing Sheets

X 5,000

6 μm

SOLID ELECTROLYTIC CAPACITOR AND METHOD FOR PRODUCING THE SAME

CROSS-REFERENCE TO RELATED APPLICATIONS

The present application is an application pursuant to Article 111, Section (a) of 35 U.S.C. with claiming in compliance with Article 119, Section (e)(i) the benefit of earlier application dates of Provisional Applications Nos. 60/123,985 and 60/123,986, filed on Mar. 11, 1999 for the both, filed under Article 111, Section (b).

This application is a continuation-in-part of Ser. No. 09/369,419, filed on Aug. 6, 1999, now U.S. Pat. No. 6,344,966 issued on Feb. 5, 2002, and a continuation-in-part of PCT/JP99/02647, filed on May 20, 1999.

TECHNICAL FIELD

The present invention relates to a solid electrolytic capacitor and to a production method thereof. More specifically, the present invention relates to a solid electrolytic capacitor comprising a solid electrolyte having thereon an electrically conducting polymer having a n electron-conjugated system containing as a dopant at least one organic anion selected from (1) an alkoxy-substituted naphthalene monosulfonate anion, (2) a sulfonate anion of a heterocyclic compound, and (3) an anion of an aliphatic polycyclic compound and also relates to a production method of the capacitor. Preferably, the present invention relates to a solid electrolytic capacitor comprising a solid electrolyte additionally containing another anion having a dopant ability other than the organic anion dopant, and also relates to a production method of the capacitor.

BACKGROUND ART

A solid electrolytic capacitor is a device where an oxide film layer, a dielectric material, is formed on an anode substrate comprising a metal foil subjected to etching treatment, a solid semiconductor layer (hereinafter, simply referred to as a solid electrolyte) is formed as an opposing electrode outside the oxide dielectric layer and preferably an electric conductor layer such as an electrically conducting paste is further formed thereon. The device is actually used after the entire device is completely sealed by an epoxy resin or the like.

For the solid electrolyte, it has been heretofore known to use, for example, an inorganic semiconductor material such as manganese dioxide and lead dioxide, a tetracyanoquinodimethane (TCNQ) complex salt, an intrinsic electrically conducting polymer having an electric conductivity in the range of from $10^{-3}$ to $5 \times 10^3$ S/cm (JP-A-1-169914 (the term "JP-A" as used herein means an "unexamined published Japanese patent application")(U.S. Pat. No. 4,803, 596)) or a π-conjugated polymer such as polyaniline (JP-A-61-239617), polypyrrole (JP-A-61-240625), polythiophene derivative (JP-A-2-15611 (U.S. Pat. No. 4,910,645)) or polyisothianaphthene (JP-A-62-118511). Many of these electrically conducting polymers, which comprise a polymer main chain having a π-conjugated repeating structural unit and a dopant contained in the polymer chain, are used as an electrically conducting polymer layer (or a polymer-type charge-transfer complex). Furthermore, in recent years, not only dopants are used singly but also they are used in combination with, for example, manganese dioxide (JP-B-6-101418 (the term "JP-B" as used herein means an "examined Japanese patent publication" (U.S. Pat. No. 4,959,753)) or a filler (JP-A-9-320901).

With respect to the method for forming a solid electrolyte layer, a method of fusing and thereby forming an electrically conducting polymer layer on a dielectric layer provided on a valve-acting metal surface having a microfine void structure and a method of producing the above-mentioned electrically conducting polymer on a dielectric layer have been conventionally known. More specifically, for example, in the case of using a polymer of a 5-membered heterocyclic compound such as pyrrole or thiophene, a method of dipping an anode foil in a lower alcohol/water-based solution of a 5-membered heterocyclic compound and then dipping the anode foil in an aqueous solution having dissolved therein an oxidizing agent and an electrolyte to give rise to chemical polymerization, thereby forming an electrically conducting polymer (JP-A-5-175082), and a method of applying a 3,4-dioxyethylenethiophene monomer and an oxidizing agent each preferably in the form of a solution to an oxide coating layer of a metal foil separately differing in time or simultaneously to thereby form a solid electrolyte layer (JP-A-2-15611 (U.S. Pat. No. 4,910,645)) and JP-A-10-32145 (EP-A-820076(A2), (the term "EP-A" as used herein means an "unexamined published European patent application")) are known.

In particular, JP-A-10-32145 discloses polymers of a monomer selected from pyrrole, thiophene, furan, aniline and derivatives thereof and doped with an aromatic polysulfonic acid (e.g., naphthalene disulfonic acid) having a plurality of sulfonic acid groups in the molecular structure thereof, and also discloses a polymerization method as the production method of the polymer, where a mixed solution of the above-described polymerizable monomer and an oxidizing agent is coated and dried or an oxidizing agent is introduced and then the polymerizable monomer is introduced.

Also, JP-A-10-32145 discloses a production method using the dopant of the above-described aromatic polysulfonic acid as a constituent component of the oxidizing agent (ferric salt), stating that the solid electrolytic capacitor comprising this dopant has excellent effects on the high temperature resistance or to prevent deterioration in the static capacitance.

Furthermore, JP-B-6-82590 (U.S. Pat. No. 4,959,753) discloses a solid electrolytic capacitor containing as a dopant an alkylnaphthalene sulfonate anion substituted by one or more alkyl groups, which has excellent effects on the initial property or leakage current property.

Known examples of the oxidizing agent for use, for example, in the chemical polymerization of 5-membered heterocyclic compounds such as thiophene include iron(III) chloride, $Fe(ClO_4)_3$, organic acid iron(III) salt, inorganic acid iron(III) salt, alkyl persulfate, ammonium persulfate (hereinafter simply referred to as "APS"), hydrogen peroxide, $K_2Cr_2O_7$ (see, JP-A-2-15611 (U.S. Pat. No. 4,910, 645)), cupric compounds and silver compounds (see, JP-A-10-32145 (EP-A-820076(A2))).

However, the capacitor comprising a solid electrolyte using the manganese dioxide is disadvantageous in that the oxide dielectric film layer is ruptured at the thermal decomposition of manganese nitrate and the impedance property is not satisfied. In the case of using lead dioxide, its effect on the environment must be taken into account. The capacitor comprising a solid electrolyte using a TCNQ complex salt has good heat fusion workability and excellent electric conductivity but the TCNQ complex salt itself has a problem in the heat resistance and accordingly, the soldering heat resistance is poorly reliable. In order to overcome these problems, an electrically conducting polymer such as polypyrrole is applied to the solid electrolyte on the surface of a dielectric by electrolytic polymerization or chemical polymerization but satisfactory results cannot be obtained with respect to the homogeneity of film, soldering heat resistance, impedance property and the like.

Demands for the production of a capacitor device having high performance are recently increasing and to cope with this tendency, further improvements are required on the material for the solid electrolyte, production method thereof, heat stability, homogeneity of the film and the like.

DISCLOSURE OF THE INVENTION

Under these circumstances, an object of the present invention is to provide a solid electrolytic capacitor having excellent properties satisfying the requirements with respect to the reduction in the weight and size, high capacity, high frequency property, tan δ, leakage current, heat resistance (reflow property), durability, etc. In particular, an object of the present invention is to provide a heat resistant solid electrolytic capacitor having excellent low impedance property and exhibiting durability in a sparking voltage test.

In order to attain the above-described objects, the present inventors have made extensive investigations on the kind, combination and content of a dopant anion in the electrically conducting polymer which works out to a solid electrolyte and as a result, they have now found that the above-described object of the present invention can be accomplished by provision of a specified organic anion in the solid electrolyte concerned in a solid electrolytic capacitor comprising opposing electrodes, one part electrode being a dielectric layer comprising a metal oxide and having a microfine structure provided on the surface of a valve-acting metal foil, and a solid electrolyte comprising an electrically conducting polymer formed on the dielectric layer.

More specifically, the present invention provides a solid electrolytic capacitor, which is compact and has high-performance, low impedance and exhibiting durability in a sparking voltage test, wherein the solid electrolyte contains as a dopant at least one organic anion selected from (1) an alkoxy-substituted naphthalene monosulfonate anion substituted by at least one linear or branched, saturated or unsaturated alkoxy group having 1 to 12 carbon atoms, (2) a sulfonate anion of a heterocyclic compound having a 5- or 6-membered heterocyclic ring (hereafter, referred to as heterocyclic sulfonate anion), and (3) an anion of an aliphatic polycyclic compound. The present invention also provides a production method of such a solid electrolytic capacitor.

The present invention provides the following:

[1] A solid electrolytic capacitor comprising an oxide dielectric film having provided thereon an electrically conducting polymer layer containing a π electron-conjugated structure, wherein the polymer layer contains as a dopant at least one organic anion selected from (1) an alkoxy-substituted naphthalene monosulfonate anion substituted by at least one linear or branched, saturated or unsaturated alkoxy group having from 1 to 12 carbon atoms, (2) a sulfonate anion of a heterocyclic compound having a 5- or 6-membered heterocyclic ring (hereinafter referred to as a "heterocyclic sulfonate anion")), and (3) an anion of an aliphatic polycyclic compound.

[2] The solid electrolytic capacitor as described in 1 above, wherein the organic anion as a dopant is an alkoxy-substituted naphthalene monosulfonate anion substituted by at least one linear or branched, saturated or unsaturated alkoxy group having from 1 to 12 carbon atoms.

[3] The solid electrolytic capacitor as described in 2 above, wherein at least one hydrogen on an aromatic ring of the alkoxy-substituted naphthalene monosulfonate is substituted by a substituent selected from a halogen atom, a nitro group, a cyano group, and a trihalomethyl group.

[4] The solid electrolytic capacitor as described in 1 above, wherein the organic anion as a dopant is an anion of heterocyclic sulfonate anion.

[5] The solid electrolytic capacitor as described in 4 above, wherein the heterocyclic sulfonate anion is an anion having heterocyclic skeleton selected from the group consisting of compounds containing a chemical structure of morpholine, piperidine, piperazine, imidazole, furan, 1,4-dioxane, benzimidazole, benzothiazolylthio, benzisoxazole, benzotriazole or benzofuran.

[6] The solid electrolytic capacitor as described in 4 above, wherein the heterocyclic sulfonate anion contains at least one alkylsulfonate substituent in the chemical structure thereof.

[7] The solid electrolytic capacitor as described in 1 above, wherein the organic anion as a dopant is an anion of an aliphatic polycyclic compound.

[8] The solid electrolytic capacitor as described in any of 1 to 7 above, wherein the organic anion is contained in an amount of from 0.1 to 50 mol % based on all the repeating structural units of the electrically conducting polymer.

[9] The solid electrolytic capacitor as described in any of 1 to 8, wherein in addition to the organic anion, a reductant anion of an oxidizing agent having a dopant ability is contained in an amount of from 0.1 to 10 mol %.

[10] The solid electrolytic capacitor as described in 9 above, wherein the reductant anion of an oxidizing agent is a sulfate ion.

[11] The solid electrolytic capacitor comprising an oxide dielectric film having provided thereon an electrically conducting polymer as described in any of 1 to 4 above, wherein the electrically conducting polymer contains a repeating structural unit represented by the following general formula I:

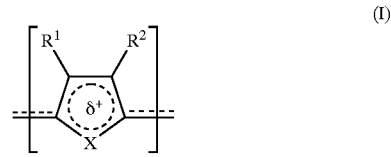

(I)

(wherein the substituents $R^1$ and $R^2$ each independently represents any one monovalent group selected from hydrogen, a linear or branched, saturated or unsaturated alkyl group having from 1 to 6 carbon atoms, a linear or branched, saturated or unsaturated alkoxy group having from 1 to 6 carbon atoms, a hydroxyl group, a halogen atom, a nitro group, a cyano group, a trihalomethyl group, a phenyl group and a substituted phenyl group, $R^1$ and $R^2$ may be combined to each other at any position to form at least one divalent chain for forming at least one 5-, 6- or 7-membered saturated or unsaturated ring structure, X represents a hetero atom selected from S, O, Se, Te or $NR^3$, $R^3$ represents hydrogen, a linear or branched, saturated or unsaturated alkyl group having from 1 to 6 carbon atoms, a phenyl group or a linear or branched, saturated or unsaturated alkoxy group having from 1 to 6 carbon atoms, the alkyl group and the alkoxy group represented by $R^1$, $R^2$ or $R^3$ may optionally contain in the chain thereof a carbonyl bond, an ether bond, an ester bond, an amide bond or an imino bond, and δ is from 0 to 1).

[12] The solid electrolytic capacitor as described in 11 above, wherein the repeating structural unit represented by formula (I) is a chemical structure represented by the following general formula (II):

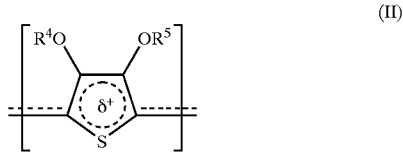

(wherein the substituents $R^4$ and $R^5$ each independently represents hydrogen, a linear or branched, saturated or unsaturated alkyl group having from 1 to 6 carbon atoms or a substituent for forming at least one 5-. 6- or 7-membered heterocyclic structure containing the two oxygen elements shown in the formula by combining the linear or branched, saturated or unsaturated alkyl groups having from 1 to 6 carbon atoms to each other at any position, the ring structure formed in the scope thereof includes a chemical structure such as a substituted vinylene group and a substituted o-phenylene group, and $\delta$ is from 0 to 1).

[13] A method for producing a solid electrolytic capacitor comprising an oxide dielectric film having provided thereon an electrically conducting polymer composition layer described in 1 above, the method comprising polymerizing a polymerizable monomer compound on an oxide dielectric film by an oxidizing agent, wherein the polymerizable monomer compound is a compound represented by the following general formula (III):

(wherein $R^1$, $R^2$ and X are the same as defined in the general formula (I) above) and the polymerization reaction takes place in the presence of a compound capable of providing at least one organic anion selected from (1) an alkoxy-substituted naphthalene monosulfonate anion substituted by at least one linear or branched, saturated or unsaturated alkoxy group having from 1 to 12 carbon atoms, (2) a sulfonate anion of a heterocyclic compound having a 5- or 6-membered heterocyclic ring (hereinafter referred to as a "heterocyclic sulfonate anion"), and (3) an anion of an aliphatic polycyclic compound.

[14] The method for producing a solid electrolytic capacitor as described in 13 above, wherein the polymerizable monomer compound represented by formula (III) is a compound represented by the following general formula (IV):

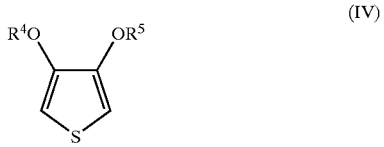

(wherein $R^4$ and $R^5$ are the same as defined in the general formula (II)).

[15] The method for producing a solid electrolytic capacitor as described in 13 or 14 above, wherein said method comprises a step of dipping a valve-acting metal anode foil having formed thereon an oxide dielectric film layer in a solution containing a polymerizable monomer compound and a step of dipping the metal anode foil in a solution containing an oxidizing agent and above-described organic anion.

[16] The method for producing a solid electrolytic capacitor as described in 13 or 14 above, wherein said method comprises a step of dipping a valve-acting metal anode foil having formed thereon an oxide dielectric film layer in a solution containing an oxidizing agent and a step of dipping the metal anode foil in a solution containing a polymerizable monomer compound and above-described organic anion.

[17] The method for producing a solid electrolytic capacitor as described in 13 or 14 above, wherein said method comprises a step of dipping a valve-acting metal anode foil having formed thereon an oxide dielectric film layer in a solution containing an oxidizing agent and then a step of dipping the metal anode foil in a solution containing a polymerizable monomer compound and above-described organic anion.

[18] The method for producing a solid electrolytic capacitor as described in 13 or 14 above, wherein said method comprises a step of dipping a valve-acting metal anode foil having formed thereon an oxide dielectric film layer in a solution containing a polymerizable monomer compound and then a step of dipping the metal anode foil in a solution containing an oxidizing agent and above-described organic anion.

[19] The method for producing a solid electrolytic capacitor as described in 13 or 14 above, wherein said method comprises a step of dipping a valve-acting metal anode foil having formed thereon an oxide dielectric film layer in a solution containing an oxidizing agent and above-described organic anion and then a step of dipping the metal anode foil in a solution containing a polymerizable monomer compound.

[20] The method for producing a solid electrolytic capacitor as described in 13 or 14 above, wherein said method comprises a step of dipping a valve-acting metal anode foil having formed thereon an oxide dielectric film layer in a solution containing a polymerizable monomer compound and above-described organic anion and then a step of dipping the metal anode foil in a solution containing an oxidizing agent.

[21] The method for producing a solid electrolytic capacitor as described in 13 or 14 above, wherein said method comprises a step of repeating multiple times a process of dipping a valve-acting metal anode foil having formed thereon an oxide dielectric film layer in a solution containing an oxidizing agent and above-described organic anion and then a process of dipping the metal anode foil in a solution containing a polymerizable monomer compound.

[22] The method for producing a solid electrolytic capacitor as described in 13 or 14 above, wherein said method comprises a step of repeating multiple times a process of dipping a valve-acting metal anode foil having formed thereon an oxide dielectric film layer in a solution containing a polymerizable monomer compound and above-described organic anion and then a process of dipping the metal anode foil in a solution containing an oxidizing agent.

[23] The method for producing a solid electrolytic capacitor as described in 13 or 14 above, wherein said method comprises a step of repeating multiple times a process of dipping a valve-acting metal anode foil having formed thereon an oxide dielectric film layer in a solution containing an oxidizing agent and then a process of dipping the metal anode foil in a solution containing a polymerizable monomer compound and above-described organic anion.

[24] The method for producing a solid electrolytic capacitor as described in 13 or 14 above, wherein said method comprises a step of repeating multiple times a process of dipping a valve-acting metal anode foil having formed thereon an oxide dielectric film layer in a solution containing a polymerizable monomer compound and then a process of dipping the metal anode foil in a solution containing an oxidizing agent and above-described organic anion.

[25] The method for producing a solid electrolytic capacitor as described in 13 or 14 above, wherein said method comprises a step of repeating multiple times a process of dipping a valve-acting metal anode foil having formed thereon an oxide dielectric film layer in a solution containing an oxidizing agent and above-described organic anion and then a process of dipping the metal anode foil in a solution containing a polymerizable monomer compound, followed by a step of washing and drying the metal anode foil.

[26] The method for producing a solid electrolytic capacitor as claimed in claim 13 or 14 above, wherein said method comprises a step of repeating multiple times a process of dipping a valve-acting metal anode foil having formed thereon an oxide dielectric film layer in a solution containing a polymerizable monomer compound and above-described organic anion and then a process of dipping the metal anode foil in a solution containing an oxidizing agent, followed by a step of washing and drying the metal anode foil.

[27] The method for producing a solid electrolytic capacitor as claimed in claim 13 or 14 above, wherein said method comprises a step of repeating multiple times a process of dipping a valve-acting metal anode foil having formed thereon an oxide dielectric film layer in a solution containing an oxidizing agent and then a process of dipping the metal anode foil in a solution containing a polymerizable monomer compound and above-described organic anion, followed by a step of washing and drying the metal anode foil.

[28] The method for producing a solid electrolytic capacitor as described in 13 or 14 above, wherein said method comprises a step of repeating multiple times a process of dipping a valve-acting metal anode foil having formed thereon an oxide dielectric film layer in a solution containing a polymerizable monomer compound and then a process of dipping the metal anode foil in a solution containing an oxidizing agent and above-described organic anion, followed by a step of washing and drying the metal anode foil.

[29] The method for producing a solid electrolytic capacitor as described in any of 13 to 28 above, wherein the organic anion is an alkoxy-substituted naphthalene monosulfonate anion substituted by at least one linear or branched, saturated or unsaturated alkoxy group having from 1 to 12 carbon atoms.

[30] The method for producing a solid electrolytic capacitor as described in 29 above, wherein at least one hydrogen on an aromatic ring of the alkoxy-substituted naphthalene monosulfonate anion is substituted by a substituent selected from a halogen atom, a nitro group, a cyano group, and a trihalomethyl group.

[31] The method for producing a solid electrolytic capacitor as described in any of 13 to 28 above, wherein the organic anion is a heterocyclic sulfonate anion.

[32] The method for producing a solid electrolytic capacitor as described in 31 above, wherein the heterocyclic sulfonate anion is an anion having at least one heterocyclic skeleton selected from the group consisting of compounds containing a chemical structure of morpholine, piperidine, piperazine, imidazole, furan, 1,4-dioxane, benzimidazole, benzothiazolylthio, benzisoxazole, benzotriazole or benzofuran.

[33] The method for producing a solid electrolytic capacitor as described in 31 above, wherein the heterocyclic sulfonate anion contains at least one alkylsulfonate substituent in the chemical structure thereof.

[34] The method for producing a solid electrolytic capacitor as described in any of 13 to 28 above, wherein the organic anion as a dopant is an anion of an aliphatic polycyclic compound.

[35] The method for producing a solid electrolytic capacitor as described in any of 13 to 34 above, wherein the oxidizing agent is a persulfate.

[36] The solid electrolytic capacitor as described in 1 above, wherein the solid electrolyte has at a portion which is of a lamellar structure.

[37] The solid electrolytic capacitor as described in 36 above, wherein the solid electrolyte having at a portion which is of a lamellar structure is formed on an outer surface of the dielectric film or on an outer surface and inside a fine pore portion thereof.

[38] The solid electrolytic capacitor as described in 36 or 37 above, wherein adjacent lamellae define an interstitial space therebetween over at least a portion of opposing surfaces thereof.

[39] The solid electrolytic capacitor as described in 36 or 37 above, wherein each lamella of the solid electrolyte constituting the lamellar structure is in the range of from 0.01 to 5 $\mu$m, and the solid electrolyte layer has a total thickness in the range of from 1 to 200 $\mu$m.

DETAIL DESCRIPTION OF THE INVENTION

Figure 1:
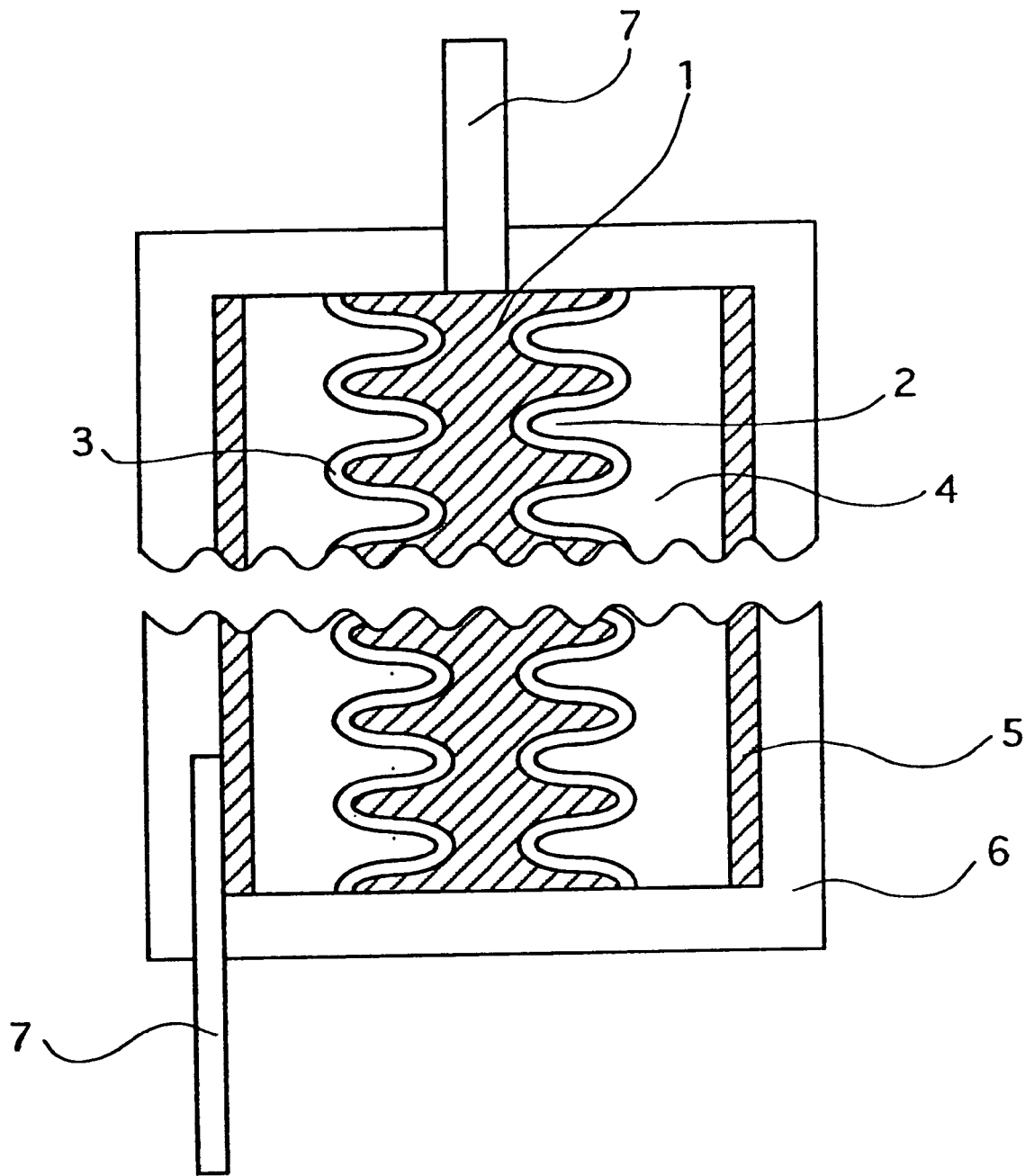
FIG. 1 is a vertical cross-sectional view showing a representative example of the solid electrolytic capacitor according to the present invention having a valve-acting metal foil.
Figure 2:
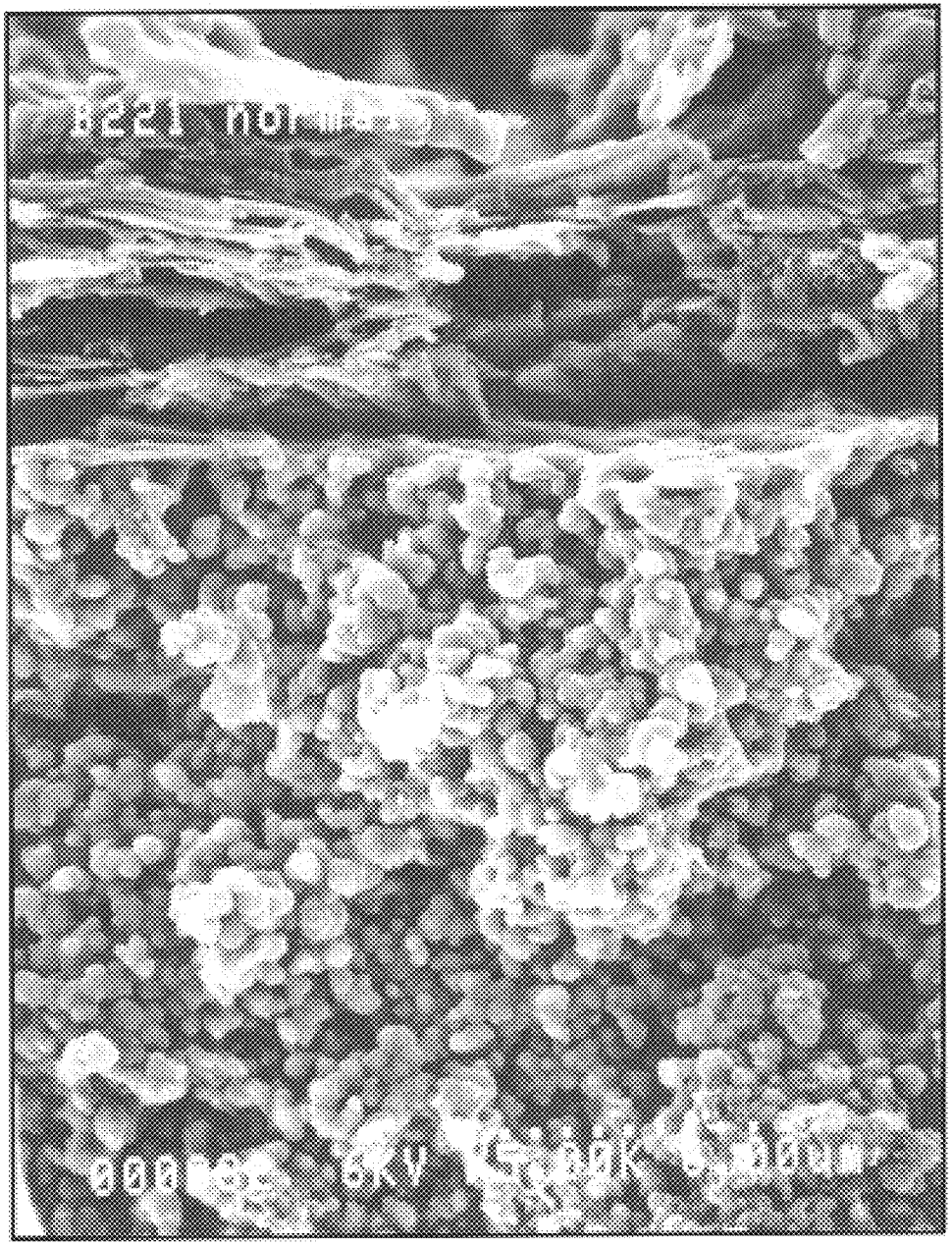
FIG. 2 is a scanning electron micrograph at a magnification of ×5,000 of the cross sectional surface of aluminum foil having a fine structure having formed therein an electrically conducting polymer layer in Example 32.
Figure 2:

The present invention is described in detail below.

In the present invention, the electrically conducting polymer layer contains at least one organic anion selected from (1) an alkoxy-substituted naphthalene monosulfonate anion substituted by at least one linear or branched, saturated or unsaturated alkoxy group having 1 to 12 carbon atoms, (2) a sulfonate anion of a heterocyclic compound having a 5- or 6-membered hetero ring (hereafter, referred to as heterocyclic sulfonate anion), and (3) an anion of an aliphatic polycyclic compound as a main anion having a dopant ability, so that a preferred electrically conducting polymer layer (charge-transfer complex) having good heat resistance can be formed. As a result, a high-performance solid electrolytic capacitor having low impedance property and excellent durability in a sparking voltage test or the like and a production method thereof can be provided.

Furthermore, in the present invention, another anion other than above-described organic anion dopant is used as a dopant in combination, therefore, higher performance in the above-described properties can be attained.

The $\pi$ electron-conjugated polymer in an electrically conducting polymer layer suitable for the capacitor of the present invention is a polymer having a $\pi$ electron-conjugated system in the polymer main chain structure. Specific examples thereof include polyaniline, poly-p-phenylene, poly-p-phenylenevinylene, polythienylenevinylene, polyheterocyclic polymer and substituted derivatives thereof. Preferred examples of the polyheterocyclic polymers include a n electron-conjugated polymer comprising a structural unit represented by general formula (I), and more preferrably a π electron-conjugated polymer comprising a structural unit represented by general formula (II).

In general formulae (I) and (III) above, useful examples of the linear or branched, saturated or unsaturated alkyl group having 1 to 6 carbon atoms represented by the substituents $R^1$, $R^2$ or $R^3$, include methyl, ethyl, vinyl, propyl, allyl, isopropyl, butyl and 1-butenyl. Useful examples of the linear or branched, saturated or unsaturated alkoxy group having from 1 to 6 carbon atoms include methoxy, ethoxy, propoxy, isopropoxy and butoxy. Useful examples of the substituent other than the above-described alkyl group and alkoxy group include a nitro group, a cyano group, a phenyl group and a substituted phenyl group (e.g., phenyl groups substituted by a halogen group such as Cl, Br, F, etc.). The alkyl group or alkoxy group in $R^1$ or $R^2$ may optionally contain in the chain thereof a carbonyl bond, an ether bond, an ester bond, an amide bond or an imino bond, and particularly useful examples thereof include a methoxyethoxy group and a methoxyethoxyethoxy group.

The substituents $R^1$ and $R^2$ may be combined to each other at any position to form at least one divalent chain for forming at least one 5-, 6- or 7-membered saturated or unsaturated ring structure. Specific examples of the structure represented by general formulae (I) or (III) include a 3,4-propylene-substituted structure (V), a 3,4-butylene-substituted structure (VI), 3,4-butenylene-substituted structure (VII), 3,4-butadienylene-substituted structure (VIII) and a naphtho[2,3-c]-condensed structure (IX).

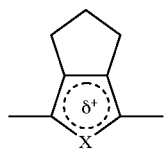

(V)

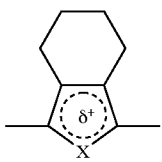

(VI)

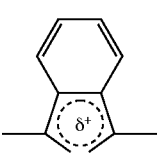

(VII)

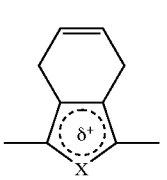

(VIII)

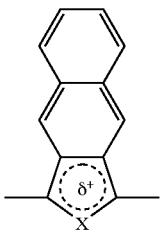

(IX)

In the above-described formulae, X represents a hetero atom and examples thereof include S, O, Se, Te and $NR^3$. The above-described 3.4 -butadienylene-substituted structure where X is S is denoted an isothianaphthenylene structure in the case of the monomer compound structure of general formula (I) or denoted isothianaphthene in the case of the monomer compound structure of general formula (III). Similarly, the naptho[2,3-c]-condensed structure is denoted a naphtho [2,3-c]thienylene structure in the case of general formula (I) or denoted naphtho[2,3-c]thiophene in the case of the monomer compound structure of general formula (III). In the formulae, δ represents a number of charges per the repeating structural unit and is from 0 to 1.

Useful examples of the substituents $R^4$ and $R^5$ in general formulae (II) and (IV) include methyl, ethyl, propyl, isopropyl, vinyl and allyl. Furthermore, $R^4$ and $R^5$ may be substituents of which alkyl groups having from 1 to 6 carbon atoms are bonded to each other at any position to form at least one 5-, 6- or 7-membered heterocyclic ring structure containing the two oxygen elements in general formulae (II) or (IV). Preferred examples thereof include 1,2-ethylene, 1,2-propylene and 1,2-dimethylethylene. Furthermore, the alkyl groups each having from 1 to 6 carbon atoms represented by $R^4$ and $R^5$ may be combined to each other at any position to form an unsaturated hydrocarbon ring structure such as a substituted vinylene group and a substituted o-phenylene group, and examples thereof include 1,2-vinylene (X), 1,2-propenylene (XI), 2,3-butylen-2-ene (XII), 1,2-cyclohexylene (XIII), methyl-o-phenylene (XIV), 1,2-dimethyl-o-phenylene (XV) and ethyl-o-phenylene (XVI).

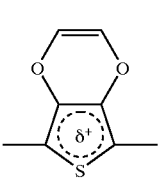

(X)

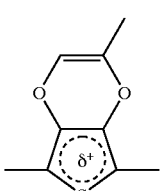

(XI)

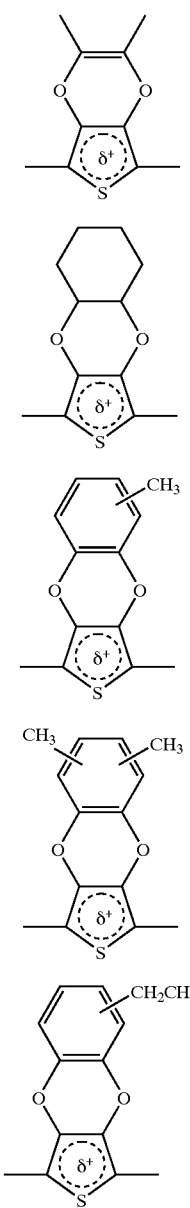

Among the polymerizable monomer compounds represented by general formula (III) for use in the solid electrolytic capacitor and the production method thereof of the present invention, for example, thiophene ($R^1=R^2=H$, X=S) and pyrrole ($R^1=R^2=H$, X=NH), or among thiophenes represented by general formula (IV), a polymerizable monomer compound of 3,4-dioxyethylene-thiophene are known. Also, many oxidizing agents which can polymerize such a polymerizable monomer compound are known. However, a capacitor comprising a solid electrolyte produced from an electrically conducting composition containing the above-described organic anion in any of (1) to (3) as a dopant or using another anion in combination as an auxiliary dopant, has been heretofore unknown.

More specifically, JP-A-10-32145 supra discloses as an electrically conducting polymer of a capacitor only a polymer selected from pyrrole, thiophene, furan, aniline and derivatives thereof each doped with an aromatic polysulfonate compound dopant having a plurality of sulfonic acid groups in the molecular structure thereof (e.g., naphthalene disulfonate anion). This patent publication does not disclose the organic anion in any one of (1) to (3) above for use in the capacitor of the present invention. Furthermore, the excellent effect owing to the another dopant other than the organic anion in any one of (1) to (3) above, contained in combination is unknown either.

In the solid electrolytic capacitor of the present invention, the dopant constituting the solid electrolyte is preferably doped such that the organic anion in any one of (1) to (3) above is contained in an amount of from 0.1 to 50 mol %, and more preferably another dopant other than the organic anion in any one of (1) to (3) above is additionally contained in an amount of from 0.1 to 10 mol %, based on the total weight of the π-conjugated polymer composition. By virtue of this construction, a high-performance capacitor not only capable of solving the above-described problems but also favored with low impedance property and excellent heat resistance and durability in a sparking voltage test is provided. Such a capacitor has been heretofore unknown.

The capacitor of the present invention comprises a solid electrolyte capable of providing a capacitor particularly favored with low impedance property and excellent sparking voltage proof property, wherein the amount of the organic anion in any one of (1) to (3) above contained is preferably from 1 to 30 mol % based on the total weight of the π-conjugated polymer composition.

On the other hand, the amount of another dopant contained in addition to the above-described organic anion is preferably from 0.1 to 5 mol % based on the total weight of the π-conjugated polymer composition. In the production method of the present invention, where an oxidizing agent is used at the time of the polymerization of the polymerizable monomer compound, the another dopant is contained as a reduced form anion of the oxidizing agent. However, it may be separately added by a different method and the method therefor is not limited.

Usually, the method for producing the above-described solid electrolyte plays an important role in the production of a capacitor for attaining high capacity and high frequency property and in the improvement of tan δ, leakage current, heat resistance (reflow property), impedance, durability, etc. To these effects, the combination of π electron-conjugated structure and dopant constituting the solid electrolyte and also the increase or improvement in the homogeneity of the electric conducting path by densely-filling and forming an electrically conducting polymer layer on a fine dielectric layer are important. In particular, the constitution of the electrically conducting polymer has a great effect on the capacitor properties.

In the solid electrolytic capacitor according to a preferred embodiment of the present invention, at least a portion of the solid electrolyte layer is of a lamellar structure so as to have thermal stress relaxation properties.

The solid electrolyte layer is formed in an inside of fine pore portion or on an outer surface of the dielectric material layer on the surface of the valve-acting metal. The thickness of the outer surface layer is in the range of from 1 to 200 μm, preferably from 1 to 100 μm. In the present invention, the lamellar structure is formed mostly on the outer surface but it is desirable that it is also formed inside the cavity of fine pores. Most lamellae are formed substantially in parallel to the surface of the valve-acting metal. Adjacent lamellae define an interstitial space therebetween over at least a portion of their opposing surfaces. The thickness of each lamella or unit layer constituting the lamellar structure is in the range of from 0.01 to 5 µm, preferably in the range of from 0.01 to 1 µm, more preferably from 0.1 to 0.3 µm.

The production method of the solid electrolyte according to the present invention is characterized in that the above-described organic anion or a combination of it with another anion is contained as the dopant for the polymer of the polymerizable monomer compound. More specifically, the present invention relates to a production method comprising a step of causing oxidative polymerization of a polymerizable monomer compound represented by general formulae (III) or (IV) on a finely porous dielectric layer in the presence of a compound capable of providing the above-described organic anion by the action of an oxidizing agent, the polymer produced working out to a solid electrolyte on the dielectric surface. By performing this production step at least once, preferably repeating it from 3 to 30 times, per one anode substrate, a dense solid electrolyte layer can be easily formed.

For example, in one preferred embodiment of the production process, the polymerization step may include a step of dipping a valve-acting metal anode foil having formed thereon an oxide dielectric film layer in a solution containing an oxidizing agent (Solution 1) and a step of dipping the anode foil in a solution containing a polymerizable monomer compound and the above-described organic anion (Solution 2). or may include a step of dipping the anode foil in Solution 2 and then dipping it in Solution 1 or a step of dipping the anode foil in Solution 1 and then dipping it in Solution 2.

In another embodiment, the production method may include a step of dipping the anode foil in a solution containing an oxidizing agent and the above-described anion (Solution 3) and a step of dipping the anode foil in a solution containing a polymerizable monomer compound (Solution 4) or may include a step of dipping the anode foil in Solution 4 and then dipping it in Solution 3 or a step of dipping the anode foil in Solution 3 and then dipping it in Solution 4. Solutions 1 to 4 each may be used in the state of a suspension.

Furthermore, the dipping step may be easily changed to a coating operation. Solutions 1 to 4 may be the same or different solvent systems, as needed. According to the kind of the solvent, a drying step may be additionally provided between the process with Solution 1 and the process with Solution 2 or between the process with Solution 3 and the process with Solution 4. After producing the solid electrolyte, a step of washing the device with an organic solvent or with water may be provided. In this case, it is simple and preferred to use the solvent used in any of Solutions 1 to 4 as the organic solvent for use in the washing. However, any solvent may be used as far as it can merely dissolve the polymerizable monomer compound, the above-described organic anion or the compound providing another anion having a dopant ability. By the washing with the solvent, the amount of the dopant other than the above-described organic anion, contained in the polymer may be reduced. However, the presence of at least the above-described organic anion sometimes contributes to the properties of the solid electrolytic capacitor of the present invention.

The above-described repetition of oxidative polymerization facilitates the production of a solid electrolyte having excellent soldering heat resistance (heat stability). In conventionally known capacitors using a solid electrolyte comprising polypyrrole or the like, the capacitor properties greatly fluctuate at a high temperature and a high humidity and the reliability is low. In contrast, the capacitor comprising a solid electrolyte made of an electrically conducting composition of the present invention has excellent heat stability and exhibits good stability in the doped state. This is because the polymer containing the above-described organic anion as a dopant or a combination of it with a dopant originated from an oxidizing agent can be deposited step by step and thoroughly filled into the dielectric surface and even inside the pore. As a result, a capacitor having excellent heat stability such that the dielectric film is prevented from damages by the polymer can be provided.

The above-described organic anion used in the present invention is a dopant compound exhibiting excellent thermal stability and excellent electrically conducting state stability in the formation of a charge transfer complex with a π-conjugated polymer as compared with conventionally known dopants (e.g., $ClO_4^-$, $BF_4^-$, $Cl^-$, $SO_4^{2-}$, benzene sulfonate anion, alkyl-substituted naphthalene sulfonate anion, etc.). As a result, it is understood, high-performance capacitor properties favored with low impedance properties and excellent heat resistance and superior durability in the sparking voltage test or the like are obtained.

Then, an organic anion used in the present invention is described as follows.

(1) Alkoxy-substituted Naphthalenemonosulfonate Anion

The alkoxy-substituted naphthalenemonosulfonic acid used in the present invention is a generic term of alkoxy-substituted naphthalenemonosulfonic acid compounds and other substituted naphthalenemonosulfonic acid compounds, in which one sulfonic acid group is substituted to the naphthalene skeleton. The compound is preferably a compound where at least one hydrogen on the naphthalene ring of a naphthalenemonosulfonic acid is substituted by a linear or branched, saturated or unsaturated alkoxy group having from 1 to 12, preferably 1 to 6 carbon atoms.

Specific examples of the compound capable of providing the above-described alkoxy-substituted naphthalene monosulfonate anion includes a compound having a chemical structure such that the compound skeleton is naphthalene-1-sulfonic acid, naphthalene-2-sulfonic acid or an alkali metal salt, ammonium salt or organic quaternary ammonium salt thereof and at least one hydrogen of the naphthalene ring is substituted by an alkoxy group. That is, the compound is substituted by a linear or branched, saturated or unsaturated alkoxy group having from 1 to 12 carbon atoms, and useful examples of the substituent group include methoxy, ethoxy, vinyloxy, propyloxy, allyloxy, isopropyloxy, butyloxy, 1-butenyloxy, pentyloxy, hexyloxy, octyloxy, nonyloxy and decyloxy. An alkoxy group having a cyclic hydrocarbon moiety, such as cyclohexyloxy and phenoxy, may also be used.

Useful examples of the alkoxy-substituted naphthalenemonosulfonic acid compound include a monosulfonic acid compound having a 1-alkoxynaphthalene ring substituted at any one of the 2- to 8-positions and a monosulfonic acid compound anion having a 2-alkoxynaphthalene ring substituted at any one of the 1- and 3- to 8-positions. Other than these, the or each hydrogen on the alkoxynaphthalene ring may be substituted by a halogen atom such as F, Cl, Br or I, a nitro group, a cyano group or the like.

(2) Sulfonate Anion of the Heterocyclic Compounds (Hetero-cyclic Sulfonate Anion)

The heterocyclic sulfonate anion which can be used in the present invention is a generic term of anions of a heterocyclic sulfonic acid compound having a chemical structure where one or more sulfonic acid groups are substituted directly or through an alkylene group to the heterocyclic ring. Preferred examples of the skeleton of the heterocyclic compound include substituted skeletons of morpholine, piperidine, piperazine, imidazole, furan, 1,4-dioxane, benzimidazole, benzothiazolylthio, benzisoxazole, benzotriazole and benzofuran.

Preferred examples of the compound capable of providing a heterocyclic compound anion to which a sulfonate anion is indirectly substituted include, in the case of morpholine skeleton compound, 1-morpholinomethanesulfonic acid, 2-morpholinoethanesulfonic acid, 3-morpholinopropanesulfonic acid, 2-methyl-2-morpholinopropanesulfonic acid, 4-morpholinobutanesulfonic acid, 5-morpholinopentanesulfonic acid, 6-morpholinohexanesulfonic acid, 7-morpholinoheptanesulfonic acid, 8-morpholinooctanesulfonic acid, 9-morpholinononanesulfonic acid, 10-morpholinodecanesulfonic acid, 12-morpholinododecanesulfonic acid and the like;

in the case of piperidine skeleton compound, 1-piperidinomethanesulfonic acid, 2-piperidinoethanesulfonic acid, 3-piperidinopropanesulfonic acid, 2-methyl-2-piperidinopropanesulfonic acid, 4-piperidinobutanesulfonic acid, 5-piperidinopentanesulfonic acid, 6-piperidinohexanesulfonic acid, 7-piperidinoheptanesulfonic acid, 8-piperidinooctanesulfonic acid, 9-piperidinononanesulfonic acid, 10-piperidinodecanesulfonic acid, 12-piperidinododecanesulfoncic acid and the like;

in the case of piperazine skeleton compound, piperazine-1,4-bis(1-sulfomethyl), piperazine-1,4-bis(2-sulfoethyl), piperazine-1,4-bis(3-sulfopropyl), piperazine-1,4-bis(4-sulfobutyl), piperazine-1,4-bis(5-sulfopentyl), piperazine-1,4-bis(6-sulfohexyl), piperazine-1,4-bis(7-sulfoheptyl), piperazine-1,4-bis(8-sulfooctyl), piperazine-1,4-bis(9-sulfononyl), piperazine-1,4-bis(10-sulfodecyl), piperazine-1,4-bis(12-sulfododecyl) and the like;

in the case of imidazole skeleton compound, 1-(2-imidazolyl)methanesulfonic acid, 2-(2-imidazolyl)ethanesulfonic acid, 3-(2-imidazolyl)propanesulfonic acid, 2-methyl-2-(2-imidazolyl)propanesulfonic acid, 4-(2-imidazolyl)butanesulfonic acid, 5-(2-imidazolyl)pentanesulfonic acid, 6-(2-imidazolyl)hexanesulfonic acid, 7-(2-imidazolyl)heptanesulfonic acid, 8-(2-imidazolyl)octanesulfonic acid, 9-(2-imidazolyl)nonanesulfonic acid, 10-(2-imidazolyl)decanesulfonic acid, 12-(2-imidazolyl)decanesulfonic acid and the like;

in the case of furan skeleton compound, 1-(2-furanylene)methanesulfonic acid, 2-(2-furanylene)ethanesulfonic acid, 3-(2-furanyl)propanesulfonic acid, 2-methyl-2-(2-furanyl)propanesulfonic acid, 4-(2-furanyl)butanesulfonic acid, 5-(2-furanyl)pentanesulfonic acid, 6-(2-furanyl)hexanesulfonic acid, 7-(2-furanyl)heptanesulfonic acid, 8-(2-furanyl)octanesulfonic acid, 9-(2-furanyl)nonanesulfonic acid, 10-(2-furanyl)decanesulfonic acid, 12-(2-furanyl)dodecanesulfonic acid and the like;

in the case of 1,4-dioxane skeleton compound, 1-(1,4-dioxan-2-yl)methanesulfonic acid, 2-(1,4-dioxan-2-yl)ethanesulfonic acid, 3-(1,4-dioxan-2-yl)propanesulfonic acid, 2-methyl-2-(1,4-dioxan-2-yl)propanesulfonic acid, 4-(1,4-dioxan-2-yl)butanesulfonic acid, 5-(1,4-dioxan-2-yl)pentanesulfonic acid, 6-(1,4-dioxan-2-yl)hexanesulfonic acid, 7-(1,4-dioxan-2-yl)heptanesulfonic acid, 8-(1,4-dioxan-2-yl)octanesulfonic acid, 9-(1,4-dioxan-2-yl)nonanesulfonic acid, 10-(1,4-dioxan-2-yl)decanesulfonic acid, 12-(1,4-dioxan-2-yl)dodecanesulfonic acid and the like;

in the case of benzimidazole skeleton compound, 1-(1-benzimidazolyl)methanesulfonic acid, 2-(1-benzimidazolyl)ethanesulfonic acid, 3-(1-benzimidazolyl)propanesulfonic acid, 2-methyl-2-(1-benzimidazolyl)propanesulfonic acid, 4-(1-benzimidazolyl)butanesulfonic acid, 5-(1-benzimidazolyl)pentanesulfonic acid, 6-(1-benzimidazolyl)hexanesulfonic acid, 7-(1-benzimidazolyl)heptanesulfonic acid, 8-(1-benzimidazolyl)octanesulfonic acid, 9-(1-benzimidazolyl)nonanesulfonic acid, 10-(1-benzimidazolyl)decanesulfonic acid, 12-(1-benzimidazolyl)dodecanesulfonic acid and the like;

in the case of benzothiazolylthio skeleton compound, 1-(2-benzothiazolylthioyl)methanesulfonic acid, 2-(2-benzothiazolylthioyl)ethanesulfonic acid, 3-(2-benzothiazolylthioyl)propanesulfonic acid, 2-methyl-2-(2-benzothiazolylthioyl)propanesulfonic acid, 4-(2-benzothiazolylthioyl)butanesulfonic acid, 5-(2-benzothiazolylthioyl)pentanesulfonic acid, 6-(2-benzothiazolylthioyl)hexanesulfonic acid, 7-(2-benzothiazolylthioyl)heptanesulfonic acid, 8-(2-benzothiazolylthioyl)octanesulfonic acid, 9-(2-benzothiazolylthioyl)nonanesulfonic acid, 10-(2-benzothiazolylthioyl)decanesulfonic acid, 12-(2-benzothiazolylthioyl)dodecanesulfonic acid and the like;

in the case of benzisoxazole skeleton compound, 1-(1-benzisoxazolyl)methanesulfonic acid, 2-(1-benzisoxazolyl)ethanesulfonic acid, 3-(1-benzisoxazolyl)propanesulfonic acid, 2-methyl-2-(-benzisoxazolyl)propanesulfonic acid, 4-(1-benzisoxazolyl)butanesulfonic acid, 5-(1-benzisoxazolyl)pentanesulfonic acid, 6-(-benzisoxazolyl)hexanesulfonic acid, 7-(1-benzisoxazolyl)heptanesulfonic acid, 8-(1-benzisoxazolyl)octanesulfonic acid, 9-(1-benzisoxazolyl) nonanesulfonic acid, 10-(1-benzisoxazolyl)decanesulfonic acid, 12-(1-benzisoxazolyl)dodecanesulfonic acid and the like:

in the case of benzotriazole skeleton compound, 1-(2-benzotriazolyl)methanesulfonic acid, 2-(2-benzotriazolyl)ethanesulfonic acid, 3-(2-benzotriazolyl)propanesulfonic acid, 2-methyl-2-(2-benzotriazolyl)propanesulfonic acid, 4-(2-benzotriazolyl)butanesulfonic acid, 5-(2-benzotriazolyl)pentanesulfonic acid, 6-(2-benzotriazolyl)hexanesulfonic acid, 7-(2-benzotriazolyl)heptanesulfonic acid, 8-(2-benzotriazolyl)octanesulfonic acid, 9-(2-benzotriazolyl)nonanesulfonic acid, 10-(2-benzotriazolyl)decanesulfonic acid, 12-(2-benzotriazolyl)dodecanesulfonic acid and the like; and in the case of benzofuran skeleton compound, 1-(3-benzofuranyl)methanesulfonic acid, 2-(3-benzofuranyl)ethanesulfonic acid, 3-(3-benzofuranyl)

propanesulfonic acid, 2-methyl-2-(3-benzofuranyl) propanesulfonic acid, 4-(3-benzofuranyl) butanesulfonic acid, 5-(3-benzofuranyl)pent anesulfonic acid, 6-(3-benzofuranyl)hexanesulfonic acid, 7-(3-benzofuranyl)heptanesulfonic acid, 8-(3-benzofuranyl)octanesulfonic acid, 9-(3-benzofuranyl) nonanesulfonic acid, 10-(3-benzofuranyl) decanesulfonic acid, 12-(3-benzofuranyl) dodecanesulfonic acid and the like.

These sulfonic acid compounds as the compound capable of providing the anion may also be preferably used in the form of an alkali metal salt such as sodium salt or potassium salt, or a quaternary nitrogen-type compound salt such as ammonium salt.

Specific preferred examples of the heterocyclic compound where the sulfonic acid group is directly substituted to the heterocyclic skeleton include 2-imidazolesulfonic acid, furan-2-sulfonic acid, furan-3-sulfonic acid, 2-benzimidazolesulfonic acid, benzofuran-3-sulfonic acid, and an alkali metal salt such as sodium salt, an ammonium salt and a quaternary ammonium salt thereof.

The heterocyclic sulfonate anion may also be preferably in the form of a derivative where at least one hydrogen of the heterocyclic skeleton is substituted by a linear or branched, saturated or unsaturated alkyl group having from 1 to 12 carbon atoms, preferably from 1 to 6 carbon atoms.

Specific examples of the substituent include an alkyl group such as a methyl group, an ethyl group, a propyl group, an isopropyl group, a butyl group, an isobutyl group, a t-butyl group, a pentyl group, a hexyl group, an octyl group, a decyl group and a dodecyl group; an unsaturated group such as a vinyl group, an allyl group, a 3-butenyl group and a 5-hexenyl group; a methoxy group, an ethoxy group, a propyloxy group, a butyloxy group, a pentyloxy group, a hexyloxy group, an octyloxy group, a decyloxy group and a dodecyloxy group.

(3) Anion of a Aliphatic Polycyclic Compound

The anion of aliphatic polycyclic compound for use in the present invention is a compound having a dicyclic or more polycyclic aliphatic anion containing a group of BrØnsted acid such as sulfonic acid, carboxylic acid, phosphoric acid or boric acid, preferably a compound substituted with sulfonic acid or carboxylic acid, more preferably a sulfonic acid-substituted compound. Useful examples-thereof include d-camphor sulfonic acid (XVII) (another name: 10-camphor sulfonic acid), 2-camphor sulfonic acid (XVIII), 3-camphor sulfonic acid, 8-camphor sulfonic acid, d-camphor carboxylic acid and derivatives thereof. They can be used in the form of ammonium salt or alkali metal salt.

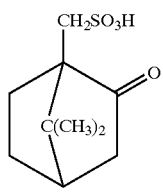

(XVII)

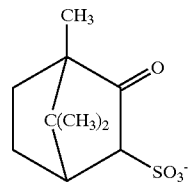

(XVIII)

The oxidizing agent for use in the present invention may be any oxidizing agent suitable for the oxidation polymerization of pyrroles or thiophenes. Examples of the oxidizing agent which can used include oxidizing agents over a wide range, such as iron(III) chloride, $Fe(ClO_4)_3$, organic acid iron(III), inorganic acid iron(III), alkyl persulfate, ammonium persulfate, hydrogen peroxide and $K_2Cr_2O_7$ described in JP-A-2-15611. Examples of the organic acid of the organic acid iron(III) include an alkylsulfonic acid (or alkanesulfonic acid) having from 1 to 20 carbon atoms such as methanesulfonic acid and dodecylbenzenesulfonic acid, and an aliphatic carboxylic acid having from 1 to 20 carbon atoms. In the strict meaning, the kind of the oxidizing agent that can be used may be restricted by the chemical structure of the polymerizable monomer compound represented by general formula (III), the oxidizing agent, reaction conditions and the like.

For example, according to Handbook of Conducting Polymers, page 99, FIG. 5, Marcel Dekker, Inc. (1987), the species of the substituent greatly affects the oxidation potential (one index for showing whether the polymerization readily or difficultly occurs) and in turn, governs the oxidation (polymerization) of thiophenes (oxidation potential expands over a wide range of from about 1.8 to about 2.7 V). Accordingly, to be more concrete, the combination of the polymerizable monomer compound and the oxidizing agent used and reaction condition is important.

The dopant other than the above-described organic anion may be one derived from a reductant anion after the reaction of the oxidizing agent. Specific examples thereof include chloride ion, $ClO_4^-$, aliphatic organic carboxylate anion having from 1 to 12 carbon atoms, sulfate ion, phosphate anion, aliphatic organophosphate anion having from 1 to 12 carbon atoms and borate anion. Furthermore, an electron acceptor dopant such as $NO^+$ and $NO_2^+$ salts (e.g., $NOBF_4$, $NOPF_6$, $NOSbF_6$, $NOAsF_6$, $NOCH_3SO_3$, $NO_2BF_4$, $NO_2PF_6$, $NO_2CF_3SO_3$) may also be used.

In the manufacturing method of a solid electrolytic capacitor of the present invention, the chemical polymerization of a thiophene monomer compound represented by general formula (IV) is particularly preferably performed using a persulfate oxidizing agent. On the other hand, the use of iron (III) salt-based oxidizing agent is not preferable in that an iron element remains in the electrically conducting polymer composition and adversely affects the capacitor properties. Persulfates suitable for the polymerizable monomer compound represented by formula (IV) are, however, not suitable for the thiophene ($R^1=R^2=H$, X=S) monomer compound represented by general formula (III), and thus the use of persulfates is limited and use as an oxidizing agent may be prohibited depending on the kind of monomer. Examples of the persulfate which can be particularly suitably used for the chemical polymerization of a thiophene represented by general formula (IV) include ammonium persulfate and potassium persulfate.

Preferred conditions for the production (polymerization) reaction are described below.

Respective concentrations of the polymerizable monomer compound represented by formula (III) or (IV), the oxidizing agent and the above-described organic anion dopant in any one of (1) to (3) above used in the manufacturing method of a capacitor of the present invention vary depending on the kind of the monomer compound, substituents thereof and the combination with a solvent or the like. However, it is in general from $1 \times 10^{-4}$ to 10 mol/l, preferably from $1 \times 10^{-3}$ to 5 mol/l. The reaction temperature varies depending on the kind of reaction methods and cannot be specifically limited. However, the reaction proceeds generally from −70 to 250° C., preferably from 0 to 150° C. and more preferably from 15 to 100° C.

Examples of the solution for use in the manufacturing method of the present invention or the solvent for use in washing after the polymerization include ethers such as tetrahydrofuran (THF), dioxane, diethyl ether, ketones such as acetone and methyl ethyl ketone, aprotic polar solvents such as dimethylformamide, acetonitrile, benzonitrile, N-methylpyrrolidone (NMP) and dimethylsulfoxide (DMSO), esters such as ethyl acetate and butyl acetate, nonaromatic chlorine-based solvents such as chloroform and methylene chloride, nitro compounds such as nitromethane, nitroethane and nitrobenzene, alcohols such as methanol, ethanol and propanol, organic acids such as formic acid, acetic acid and propionic acid, acid anhydrides of the organic acid (e.g., acetic anhydride), water, and mixed solvents thereof. Of these, preferred are water, an alcohol, a ketone and/or a combination system thereof.

The outline of the solid electrolytic capacitor of the present invention is described below by referring to FIG. 1.

For one part electrode (anode) 1 having formed on the entire surface thereof pores 2, connected to a connecting lead 7, a known material may be used, for example, a metal foil or bar having a valve action such as aluminum, titanium, tantalum, niobium or an alloy using such a metal as a base, or a sintered body mainly comprising such a metal may be used. This metal electrode is used after etching or forming the surface thereof by a known method and then forming a metal oxide film layer 3 on the metal foil so as to form a dielectric material layer and increase the specific surface area.

The solid electrolyte (electrically conducting polymer composition) 4 is preferably produced by a method of polymerizing a monomer compound on the dielectric layer, more preferably by a method of chemically depositing an electrically conducting polymer composition having excellent heat resistance of the present invention on a dielectric material having a porous or void structure.

On the thus-produced electrically conducting composition layer, another electric conductor layer is preferably provided so as to attain better electrical contacting. The electric conductor layer 5 is formed, for example, by applying an electrically conducting paste, plating, metallization or formation of an electrically conducting resin film.

The solid electrolytic capacitor thus manufactured according to the manufacturing method of the present invention is covered with a jacket 6 by means of resin molding on the electric conductor layer, a resin case, a metal-made jacket case or resin dipping and then a connecting lead 7 is provided thereto. Thus, a solid electrolytic capacitor as a final product suitable for various uses can be obtained.

BEST MODE FOR CARRYING OUT THE INVENTION

Hereafter, the present invention will be described by examples, comparative examples and reference examples. However, the present invention should by no means be construed as being limited thereby.

EXAMPLE 1

A formed aluminum foil was processed to have a prescribed area and then subjected to forming at 13 V in an aqueous 10 wt % ammonium adipate solution to prepare a dielectric material on the aluminum foil. The surface of this dielectric material was dipped in an aqueous solution prepared to have an ammonium persulfate (hereinafter simply referred to as "APS") concentration of 20 wt % and a sodium 2-propyloxynaphthalene-6-sulfonate concentration of 0.3 wt % (Solution 3), and then the dielectric foil was dipped in 1.2 mol/l of an isopropanol (hereinafter simply referred to as "IPA") solution having dissolved therein 5 g of 3,4-dioxyethylene-thiophene (Solution 4). The resulting substrate was taken out and left standing in an environment at 60° C. for 10 minutes, thereby completing the oxidative polymerization, and then the substrate was washed with water. This polymerization reaction and the washing each was repeated 10 times. The polymerization product was reduced with hydrazine in a water/IPA solvent and then carefully extracted and the contents of sulfate ion and 2-propyloxynaphthalene-6-sulfonate ion in the polymerization product were determined by an ion chromatography method. As a result, the sulfate ion content was 1.6 mol % and the 2-propyloxynaphthalene-6-sulfonate ion content was 13.6 mol %, per all the repeating structural units of the polymer. The solid electrolyte layer had an electric conductivity of 75 S/cm.

Thereafter, the aluminum foil having deposited thereon polythiophene polymerization product was treated in an aqueous 10 wt % ammonium adipate solution and then examined on the sparking voltage. The test was performed by increasing the number of devices so as to attain distinguished comparison of the device properties (the same applies to the following Examples), more specifically, in an environment of 50° C under the conditions of a current density of 10 mA/cm$^2$ with the number of device being n=5 times. The results obtained are shown in Table 1. Subsequently, the aluminum core part was welded with a plus side lead for collecting the current from the anode and on the other hand, connected to the minus side lead through carbon paste and silver paste for collecting the current from the cathode. These elements were finally sealed by an epoxy resin to manufacture a capacitor device. The capacitor device manufactured was aged at 125° C. for 2 hours and then subjected to the initial evaluation. The results obtained are shown together in Table 2. In the Table, C in the column of initial characteristics indicates a capacitance and DF indicates a tangent of the loss angle (tan δ). These were each measured at 120 Hz. The impedance is shown by a value at a resonance frequency. LC (leakage current) was measured one minute after a rated voltage was applied. The measured values each is an average of 30 samples. With respect to LC, those having an LC of 1 µA or more are judged as a defective and those having an LC of 10 µA or more are judged as a shorted product. The average LC is calculated exclusive of the defective units.

EXAMPLE 2

The surface of a dielectric material prepared in the method described in Example 1 was impregnated with an aqueous solution prepared to have an APS concentration of 20 wt % (Solution 1) and then dipped in an IPA/water mixed solution prepared by adding tetrabutylammonium 2-propyloxynaphthalene-6-sulfonate to 1.2 mol/l of an IPA solution having dissolved therein 5 g of 3,4-dioxyethylenethiophene to have a tetrabutylammonium 2-propyloxynaphthalene-6-sulfonate concentration of 0.1 wt % (Solution 2). The tetrabutylammonium 2-propyloxynaphthalene-6-sulfonate used here was one obtained by the recrystallization after mixing and reacting sodium 2-propyloxynaphthalene-6-sulfonate with tetrabutylammonium bromide. The resulting substrate was taken out and left standing in an environment at 60° C. for 10 minutes, thereby completing the oxidative polymerization, and then the substrate was washed with water. This polymerization reaction and the washing each was repeated 10 times. The capacitor device obtained was evaluated. The results are shown in Tables 1 and 2. The contents of sulfate ion and 2-propyloxynaphthalene-6-sulfonate ion in the polymerization product were determined according to the method described in Example 1. As a result, the sulfate ion content was 2.2 mol % and the 2-propyloxynaphthalene-6-sulfonate ion content was 7.5 mol %. The solid electrolyte layer had an electric conductivity of 58 S/cm.

EXAMPLE 3

A dielectric material prepared by the method described in Example 1 was dipped in 1.2 mol/l of an IPA solution having dissolved therein 5 g of 3,4-dioxyethylene-thiophene (Solution 4) and then dipped in an aqueous solution prepared to have an APS concentration of 20 wt % and a sodium 2-methoxy-naphthalene-6-sulfonate concentration of 0.1 wt % (Solution 3). The resulting substrate was taken out and left standing in an environment at 60° C. for 10 minutes, thereby completing the oxidative polymerization, and then the substrate was washed with water. This polymerization reaction and the washing each was repeated 10 times. The capacitor device obtained was evaluated and the results obtained are shown in Tables 1 and 2. The contents of sulfate ion and 2-methoxynaphthalene-6-sulfonate ion in the polymerization product were determined according to the method described in Example 1. As a result, the sulfate ion content was 1.8 mol % and the 2-methoxynaphthalene-6-sulfonate ion content was 0.8 mol %. The solid electrolyte layer had an electric conductivity of 60 S/cm.

EXAMPLE 4

A dielectric material was prepared by the method described in Example 1. The surface of this dielectric material was dipped in an aqueous solution prepared to have a potassium persulfate concentration of 10 wt % and a sodium 2-methoxynaphthalene-6-sulfonate concentration of 0.1 wt % (Solution 3) and then dipped in 1.2 mol/l of an IPA solution having dissolved therein 5 g of 3,4-dioxyethylene-thiophene (Solution 4). The resulting substrate was taken out and left standing in an environment at 60° C. for 10 minutes, thereby completing the oxidative polymerization. This dipping process was repeated 10 times, and then the substrate was washed with water and dried. The capacitor device obtained was evaluated and the results obtained are shown in Tables 1 and 2. The contents of sulfate ion and 2-methoxynaphthalene-1-sulfonate ion in the polymerization product were determined according to the method described in Example 1. As a result, the sulfate ion content was 5.9 mol % and the 2-methoxynaphthalene-6-sulfonate ion content was 15.5 mol %. The solid electrolyte layer had an electric conductivity of 73 S/cm.

EXAMPLE 5

A dielectric material was prepared by the method described in Example 1. The surface of this dielectric material was dipped in an aqueous solution prepared to have an APS concentration of 35 wt % (Solution 1) and then dipped in an IPA/water mixed solution having an tetrabutylammonium 2,3-dimethoxynaphthalene-6-sulfonate concentration of 0.04 wt % (Solution 2) prepared by adding tetrabutylammonium 2,3-dimethylnaphthalene-6-sulfonate to 1.2 mol/l of an IPA solution having dissolved therein 5 g of 3,4-dioxyethylene-thiophene. At this time, the tetrabutylammonium 2,3-dimethoxynaphthalene-6-sulfonate used was one obtained by the recrystallization after mixing and reacting sodium 2,3-dimethoxynaphthalene-6-sulfonate with tetrabutyl-ammonium bromide.

The resulting substrate was taken out and left standing in an environment at 60° C. for 10 minutes, thereby completing the oxidative polymerization. This dipping process was repeated 10 times and then the substrate was washed with water and dried. The capacitor device obtained was evaluated and the results obtained are shown in Tables 1 and 2. The contents of sulfate ion and 2,3-dimethoxynaphthalene-6-sulfonate ion in the polymerization product were determined according to the method described in Example 1. As a result, the sulfate ion content was 5.2 mol % and the 2,3-dimethoxynaphthalene-6-sulfonate ion content was 7.8 mol %. The solid electrolyte layer had an electric conductivity of 40 S/cm.

EXAMPLE 6

A dielectric material was prepared by the method described in Example 1. This dielectric material was dipped in a degassed IPA solution of 5,6-dimethoxyisothianaphthene in a concentration of 1.2 mol/l synthesized and produced by sublimation according to the method described in JP-A-2-242816 (Solution 4) and then dipped in an aqueous solution prepared by adding sodium 2-propyloxynaphthalene-6-sulfonate to an APS aqueous solution having a concentration of 20 wt % and adjusted to have a sodium 2-propyloxynaphthalene-6-sulfonate concentration of 0.1 wt % (Solution 3). The resulting substrate was taken out and left standing in an environment at 60° C. for 10 minutes, thereby completing the oxidative polymerization. This dipping process was repeated 10 times and then the substrate was washed with water and dried. The capacitor device obtained was evaluated and the results obtained are shown In Tables 1 and 2. The contents of sulfate ion and 2-propyloxynaphthalene-6-sulfonate ion in the polymerization product were determined according to the method described in Example 1. As a result, the sulfate ion content was 0.7 mol % and the 2-propyloxy-naphthalene-6-sulfonate ion content was 6.0 mol %. The solid electrolyte layer had an electric conductivity of 33 S/em.

EXAMPLE 7

A capacitor device was prepared and evaluated in the same manner as in Example 1 except for using a solution of N-methylpyrrole prepared to have the same concentration in place of 3,4-dioxyethylenethiophene used in Example 1. The results obtained are shown in Tables 1 and 2. The contents of sulfate ion and 2-methoxynaphthalene-6-sulfonate ion in the polymerization product were determined according to the method described in Example 1. As a result, the sulfate ion content was 7.8 mol % and the 2-methoxynaphthalene-6-sulfonate ion content was 12.3 mol %. The solid electrolyte layer had an electric conductivity of 7 S/cm.

EXAMPLE 8

A formed aluminum foil was processed to have a prescribed area and then subjected to forming at 13 V in an aqueous 10 wt % ammonium adipate solution to prepare a dielectric material. This dielectric material was dipped in a 30t DMF-IPA solution prepared to have a sodium 2-methoxynaphthalene-6-sulfonate concentration of 0.1 wt % and a 3,4-dioxyethylenethiophene concentration of 1.2 mol/l (Solution 2) and then dipped in a 20 wt % aqueous APS solution (Solution 1). The resulting substrate was taken out and left standing in an environment at 60° C. for 10 minutes, thereby completing the oxidative polymerization. This dipping process was repeated 10 times and then the substrate was washed with water and dried. The capacitor device obtained was evaluated and the results obtained are shown in Tables 1 and 2. The sulfate ion content was 1.5 mol % and the 2-methoxy-naphthalene-6-sulfonate ion content was 3.2 mol %, per all repeating structural units of the polymer. The solid electrolyte layer had an electric conductivity of 71 S/cm.

EXAMPLE 9

A capacitor device was prepared and evaluated in the same manner as in Example 1 except for changing the 20 wt % APS used in Example 1 to 12 wt % APS. The results are shown in Tables 1 and 2. The contents of sulfate ion and 2-methoxy-naphthalene-6-sulfonate ion in the polymerization product were determined according to the method described in Example 1. As a result, the sulfate ion content was 0.2 mol % and the 2-methoxynaphthalene-6-sulfonate ion content was 20 mol %. The solid electrolyte layer had an electric conductivity of 28 S/cm.

EXAMPLE 10

A formed dielectric material was prepared in the same manner as in Example 1 and the dielectric material obtained was dipped in a 12% IPA solution of ferric 2-methoxynaphthalene-6-sulfonate and then dipped in 1.2 mol/l of an IPA solution having dissolved therein 5 g of 3,4-dioxyethylenethiophene. The resulting substrate was left standing in an environment at 60° C. for 10 minutes, thereby completing the oxidative polymerization, and then the substrate was washed with water. This polymerization reaction and the washing each was repeated 10 times. The polymerization product was reduced with hydrazine in a water/IPA solvent and then carefully extracted and the content of 2-methoxynaphthalene-6-sulfonate ion in the polymerization product was determined by an ion chromatography method. As a result, the 2-methoxynaphthalene-6-sulfonate ion content was 17 mol % per the total repeating structural unit of the polymer. The solid electrolyte layer had an electric conductivity of 30 S/cm. Thereafter, a capacitor device was manufactured and examined on the sparking voltage and other capacitor properties in the same manner as in Example 1. The results obtained are shown in Tables 1 and 2.

EXAMPLE 11

A capacitor device was prepared and evaluated in the same manner as in Example 1 except for using a solution prepared to have a ferric sulfate concentration of 10 wt % in place of APS used in Example 1 and a sodium 2-methoxynaphthalene-6-sulfonate concentration of 0.1 wt %. The results obtained are shown in Tables 1 and 2. The contents of sulfate ion and 2-methoxy-naphthalene-6-sulfonate ion in the polymerization product were determined according to the method described in Example 1. As a result, the sulfate ion content was 24.5 mol % and the 2-methoxynaphthalene-6-sulfonate ion content was 33.8 mol %. However, the capacitor properties were poor because 8 mol % of iron ion was present and the sulfate ion content exceeded 10 mol %.

EXAMPLE 12

A capacitor device was prepared and evaluated in the same manner as in Example 1 except for using thiophene in place of 3,4-dioxyethylenethiophene used in Example 1 and using a solution prepared to have a ferric chloride concentration of 10 wt % in place of APS and a sodium 2-methoxynaphthalene-6-sulfonate concentration of 0.1 wt %. The results obtained are shown in Tables 1 and 2. The 2-methoxynaphthalene-6-sulfonate ion content in the polymerization product was determined according to the method described in Example 1 and found to be 3.1 mol %. Since sulfate ion was not contained in combination, the capacitor properties were poor.

REFERENCE EXAMPLE 1

Manufacture of a capacitor device was attempted under the same conditions as in Example 1 except for using thiophene in place of 3,4-dioxyethylenethiophene used in Example 1. However, black blue polythiophene polymer was not produced at all, thus the polymerization of thiophene was not generated by the action of APS. In other words, oxidative polymerization of thiophenes by APS was peculiar to 3,4-dioxy group-substituted thiophenes.

REFERENCE EXAMPLE 2

A capacitor device was prepared and evaluated in the same manner as in Example 1 except for using sodium 2-hydroxy-naphthalene-6-sulfonate in place of sodium 2-propyloxy-naphthalene-6-sulfonate used in Example 1. The results are shown in Tables 1 and 2. The contents of sulfate ion and 2-hydroxynaphthalene-6-sulfonate ion were determined according to the method described in Example 1. As a result, the sulfate ion content was 4.3 mol % and the 2-hydroxynaphthalene-6-sulfonate ion content was 12.1 mol %. The solid electrolyte layer had an electric conductivity of 10 S/cm.

In the sparking voltage test of Examples 1 to 9, the voltage was scarcely reduced and the dielectric film was not damaged in any case. However, in the sparking voltage test of Examples 10 to 12, although the voltage was not reduced in the capacitor using an organic iron salt of Example 10, capacitors using an inorganic iron salt underwent great reduction in the voltage and in any case, failed in holding the voltage until the test was repeated prescribed times. In particular, in the capacitor using iron sulfate of Example 11, the sparking voltage was greatly reduced due to iron ion remaining in a concentration as high as 8 mol % and the sparking voltage decreased by the dipping steps of several times, as a result, the dielectric layer was disadvantageously damaged.

TABLE 1

Sparking Voltage (unit: V, Device Number n = 5)

| | Number of Polymerization Operations | | | | | | | |
|---|---|---|---|---|---|---|---|---|
| | 1 | 2 | 3 | 4 | 5 | 6 | 8 | 10 |
| Example 1 | 19 | 19 | 19 | 19 | 19 | 19 | 19 | 19 |
| Example 2 | 19 | 19 | 19 | 19 | 19 | 19 | 19 | 19 |
| Example 3 | 19 | 19 | 19 | 19 | 19 | 19 | 19 | 19 |

TABLE 1-continued

Sparking Voltage (unit: V, Device Number n = 5)

Number of Polymerization Operations

|  | 1 | 2 | 3 | 4 | 5 | 6 | 8 | 10 |
|---|---|---|---|---|---|---|---|---|
| Example 4 | 19 | 19 | 19 | 18 | 17 | 16 | 15 | 11 |
| Example 5 | 19 | 19 | 19 | 19 | 19 | 19 | 19 | 19 |
| Example 6 | 19 | 19 | 19 | 19 | 19 | 19 | 19 | 19 |
| Example 7 | 19 | 19 | 19 | 19 | 19 | 19 | 19 | 19 |
| Example 8 | 19 | 19 | 19 | 19 | 19 | 19 | 19 | 19 |
| Example 9 | 19 | 19 | 19 | 19 | 19 | 19 | 19 | 19 |
| Example 10 | 19 | 19 | 19 | 19 | 19 | 19 | 19 | 19 |
| Example 11 | 19 | 16 | 14 | 7 | 3 | | | |
| Example 12 | 18 | 16 | 10 | 3 | | | | |
| Reference Example 1 | 19 | 18 | 15 | 11 | 9 | 3 | | |

TABLE 2

Initial Characteristics

|  | C $\mu$F | DF % | Z m$\Omega$ | LC $\mu$A | Defective/Sample units/units | Short Circuit |
|---|---|---|---|---|---|---|
| Example 1 | 8.1 | 0.8 | 60 | 0.02 | 0/30 | 0 |
| Example 2 | 8.0 | 0.8 | 60 | 0.02 | 0/30 | 0 |
| Example 3 | 7.6 | 0.8 | 60 | 0.02 | 0/30 | 0 |
| Example 4 | 7.0 | 0.8 | 60 | 0.04 | 1/30 | 0 |
| Example 5 | 6.8 | 0.9 | 60 | 0.05 | 1/30 | 0 |
| Example 6 | 6.8 | 0.8 | 60 | 0.05 | 1/30 | 0 |
| Example 7 | 4.0 | 1.3 | 60 | 0.11 | 1/30 | 0 |
| Example 8 | 8.2 | 0.7 | 60 | 0.02 | 0/30 | 0 |
| Example 9 | 6.9 | 0.7 | 60 | 0.10 | 1/30 | 0 |
| Example 10 | 6.9 | 1.0 | 60 | 0.10 | 1/30 | 0 |
| Example 11 | 6.1 | 3.2 | 83 | 0.41 | 15/30 | 10 |
| Example 12 | 5.9 | 3.0 | 87 | 0.40 | 27/30 | 16 |
| Reference Example 1 | 5.0 | 1.2 | 60 | 0.10 | 3/30 | 0 |

EXAMPLE 13

A formed aluminum foil was processed to have a prescribed area and then subjected to forming at 13 V in an aqueous 10 wt % ammonium adipate solution to form a dielectric layer on the foil surface. This formed aluminum foil (substrate) was dipped in an aqueous solution prepared so as to have an APS concentration of 20 wt % and a sodium 4-morpholinepropanesulfonate (produced by Tokyo Kasei) concentration of 0.125 wt % (Solution 3) and then dipped in 1.2 mol/l of an IPA solution having dissolved therein 5 g of 3,4-dioxyethylenethiophene (Solution 4).

The resulting substrate was taken out and left standing in an environment at 60° C. for 10 minutes, thereby completing the oxidative polymerization, and then the substrate was washed with water. This polymerization reaction and the washing each was repeated 10 times.

The substrate after the polymerization was reduced with hydrazine in a water/IPA solvent and then carefully extracted and the contents of sulfate ion and 4-morpholinepropanesulfonate ion in the electrically conducting polymer composition were determined by an ion chromatography method. As a result, the sulfate ion content was 1.5 mol % and the 4-morpholine-propanesulfonate ion content was 14.0 mol %, per all repeating structural units of the polymer in the electrically conducting polymer composition. The solid electrolyte layer had an electric conductivity of 73 S/cm.

Thereafter, the aluminum foil substrate having deposited thereon poly-3,4-dioxyethylenethiophene polymer composition was treated in an aqueous 10 wt % ammonium adipate solution and then examined on the sparking voltage. The test was performed by increasing the number of devices so as to attain distinguished comparison of the device properties (the same applies to the following Examples), more specifically, in an environment of 50° C. under the conditions of a current density of 10 mA/cm$^2$ and n=5 times. The results obtained are shown in Table 3.

Subsequently, the aluminum core part was welded with a plus side lead for collecting the current from the anode of the solid electrolytic capacitor and also connected to the minus side lead through carbon paste and silver paste for collecting the current from the cathode. These elements were finally sealed by an epoxy resin to manufacture a capacitor device. The capacitor device manufactured was aged at 125° C. for 2 hours and then subjected to the initial evaluation. The results obtained are shown together in Table 4.

In the Table 4, C in the column of initial characteristics indicates a capacitance and DF indicates a tangent of the loss angle (tan δ). These were each measured at 120 Hz. The impedance is shown by a value at a resonance frequency. LC (leakage current) was measured one minute after a rated voltage was applied. The measured values each is an average of 30 samples.

With respect to LC, those having an LC of 1 $\mu$A or more are judged as a defective and those having an LC of 10 $\mu$A or more are judged as a shorted product. The average LC is calculated exclusive of these defective units.

EXAMPLE 14

The surface of a dielectric material prepared in the method described in Example 13 was impregnated with an aqueous solution prepared to have an APS concentration of 20 wt % (Solution 1) and then dipped in an IPA/water mixed solution prepared by adding tetrabutylammonium 4-morpholinepropanesulfonate (hereinafter simply referred to as "MOPSTB") to 1.2 mol/l of an IPA solution having dissolved therein 5 g of 3,4-dioxyethylenethiophene to have tetrabutylammonium 4-morpholinepropanesulfonate concentration of 0.1 wt % (Solution 2). The MOPSTB salt used here was one obtained by the recrystallization from sodium 4-morpholinepropanesulfonate (produced by Tokyo Kasei) after mixing and reacting it with tetrabutylammonium bromide. The resulting substrate was taken out and left standing in an environment at 60° C. for 10 minutes, thereby completing the oxidative polymerization, and then the substrate was washed with water. This polymerization reaction and the washing each was repeated 10 times. The capacitor device obtained was evaluated. The measurement was performed in the same manner as in Example 13 and the results are shown in Tables 3 and 4.

The contents of sulfate ion and 4-morpholinepropanesulfonate ion in the polymer composition were determined according to the method described in Example 13. As a result, the sulfate ion content was 1.6 mol % and the 4-morpholine-propanesulfonate ion content was 8.1 mol %. The solid electrolyte layer had an electric conductivity of 56 S/cm.

EXAMPLE 15

A formed aluminum foil having produced thereon a dielectric material prepared in the same manner in Example 13 was dipped in 1.2 mol/l of an IPA solution having dissolved therein 5 g of 3,4-dioxyethylenethiophene (Solution 4) and then dipped in an aqueous solution prepared to have an APS concentration of 20 wt % and a sodium 4-morpholinepropanesulfonate concentration of 0.1 wt % (Solution 3). The resulting substrate was taken out and left standing in an environment at 60° C. for 10 minutes, thereby completing the oxidative polymerization, and then the substrate was washed with water.

This polymerization reaction and the washing each was repeated 10 times. The capacitor device obtained was evaluated in the same manner as in Example 13 and the results obtained are shown in Tables 3 and 4.

The contents of sulfate ion and 4-morpholinepropanesulfonate ion in the polymer composition were determined according to the method described in Example 13. As a result, the sulfate ion content was 2.0 mol % and the 4-morpholine-propanesulfonate ion content was 0.6 mol %. The solid electrolyte layer had an electric conductivity of 60 S/cm.

EXAMPLE 16

A formed aluminum foil having produced thereon a dielectric material prepared in the same manner as in Example 13 was dipped in 1.2 mol/l of an IPA solution having dissolved therein 5 g of 3,4-dioxyethylenethiophene (Solution 4) and then dipped in an aqueous solution prepared to have an APS concentration of 20 wt % and a sodium 4-morpholinepropanesulfonate concentration of 0.3 wt % (Solution 3). The resulting substrate was taken out and left standing in an environment at 60° C. for 10 minutes, thereby completing the oxidative polymerization, and then the substrate was washed with water.

The polymerization reaction and the washing each was repeated 10 times. The capacitor device obtained was evaluated in the same manner as in Example 13 and the results are shown in Tables 3 and 4.

The contents of sulfate ion and 4-morpholineethanesulfonate ion in the polymer composition were determined according to the method described in Example 13. As a result, the sulfate ion content was 2.1 mol % and the 4-morpholine-ethanesulfonate ion content was 0.8 mol %. The solid electrolyte layer had an electric conductivity of 68 S/cm.

EXAMPLE 17

A formed aluminum foil having produced thereon a dielectric material was prepared in the same manner as in Example 13. The surface of this dielectric material was impregnated with an aqueous solution prepared to have a potassium persulfate concentration of 10 wt % and a sodium 4-morholinepropanesulfonate (Tokyo Kasei) concentration of 0.1 wt % (Solution 3) and then dipped in 1.2 mol/l of an IPA solution having dissolved therein 5 g of 3,4-dioxyethylenethiophene. The resulting substrate was taken out and left standing in an environment at 60° C. for 10 minutes, thereby completing the oxidative polymerization. This dipping process was repeated 10 times and then the substrate was washed with water and dried. The capacitor device obtained was evaluated in the same manner as in Example 13 and the results are shown in Tables 3 and 4.

The contents of sulfate ion and 4-morpholinepropanesulfonate ion in the polymer composition were determined according to the method described in Example 13. As a result, the sulfate ion content was 6.2 mol % and the 4-morpholine-propanesulfonate ion content was 15 mol %. The solid electrolyte layer had an electric conductivity of 74 S/cm.

EXAMPLE 18

A formed aluminum foil having produced thereon a dielectric material was prepared in the same manner as in Example 13. This formed aluminum foil was dipped in a degassed IPA solution of 5,6-dimethoxyisothianaphthene in a concentration of 1.2 mol/l synthesized and produced by sublimation according to the method described in JP-A-2-242816 (Solution 4) and then dipped in an aqueous solution prepared by adding sodium 4-morpholine-propanesulfonate to an APS aqueous solution having a concentration of 20 wt % and adjusted to have a sodium 4-morpholinepropanesulfonate concentration of 0.1 wt % (Solution 3). The resulting substrate was taken out and left standing in an environment at 60° C. for 10 minutes, thereby completing the oxidative polymerization. This dipping process was repeated 10 times and then the substrate was washed with water and dried. The capacitor device obtained was evaluated in the same manner as in Example 13 and the results are shown in Tables 3 and 4.

The contents of sulfate ion and 4-morpholinepropanesulfonate ion in the polymer composition were determined according to the method described in Example 13. As a result, the sulfate ion content was 0.8 mol % and the 4-morpholine-propanesulfonate ion content was 5.7 mol %. The solid electrolyte layer had an electric conductivity of 31 S/cm.

EXAMPLE 19

A capacitor device was prepared and evaluated in the same manner as in Example 13 except for using a solution of N-methylpyrrole prepared to have the same concentration in place of 3,4-dioxyethylenethiophene used in Example 13. The results obtained are shown in Tables 3 and 4.

The contents of sulfate ion and 4-morpholinepropanesulfonate ion in the polymer composition were determined according to the method described in Example 13. As a result, the sulfate ion content was 6.8 mol % and the 4-morpholine-propanesulfonate ion content was 16.8 mol %. The solid electrolyte layer had an electric conductivity of 7 S/cm.

EXAMPLE 20

A formed aluminum foil was processed to have a prescribed area and then subjected to forming at 13 V in an aqueous 10 wt % ammonium adipate solution to prepare a dielectric material. This dielectric material was dipped in a 30% DMF-IPA solution prepared to have a sodium 4-morpholinepropanesulfonate concentration of 0.1 wt % and a 3,4-dioxyethylenethiophene concentration of 1.2 mol/l (Solution 2) and then dipped in a 20 wt % aqueous APS solution (Solution 1). The resulting substrate was taken out and left standing in an environment at 60° C. for 10 minutes, thereby completing the oxidative polymerization. This dipping process was repeated 10 times and then the substrate was washed with water and dried. The capacitor device obtained was evaluated in the same manner as in Example 13 and the results are shown in Tables 3 and 4.

The sulfate ion content was 1.7 mol % and the 4-morpholinepropanesulfonate ion content was 32 mol %, per all repeating structural units of the polymer. The solid electrolyte layer had an electric conductivity of 75 S/cm.

EXAMPLE 21

A capacitor device was prepared and evaluated in the same manner as in Example 13 except for changing the 20 wt % APS used in Example 13 to 12 wt % APS. The results are shown in Tables 3 and 4. The contents of sulfate ion and 4-morpholinepropanesulfonate ion in the polymer composition were determined according to the method described in Example 13. As a result, the sulfate ion content was 0.16 mol % and the 4-morpholinepropanesulfonate ion content was 25 mol %. The solid electrolyte layer had an electric conductivity of 34 S/cm.

EXAMPLE 22

A capacitor device was prepared and evaluated in the same manner as in Example 13 except for using a sodium 2-benzimidazolepropanesulfonate solution prepared to have the same concentration in place of sodium 4-morpholinepropane-sulfonate used in Example 13. The results are shown in Tables 3 and 4. The contents of sulfate ion and 2-benzimidazole-propanesulfonate ion in the polymer composition were determined according to the method described in Example 13. As a result, the sulfate ion content was 1.8 mol % and the 2-benzimidazolesulfonate ion content was. 14.5 mol %. The solid electrolyte layer had an electric conductivity of 70 S/cm.

EXAMPLE 23

A capacitor device was prepared and evaluated in the same manner as in Example 13 except for using a 4-methyl-1-piperazinemethanesulfonate solution prepared to have the same concentration in place of sodium 4-morpholinepropanesulfonate used in Example 13. The results obtained are shown in Tables 3 and 4. The contents of sulfate ion and 4-methyl-1-piperazinemethanesulfonate ion in the polymer composition were determined according to the method described in Example 13. As a result, the sulfate ion content was 2.0 mol % and the 4-methyl-1-piperazinemethanesulfonate ion content was 16.5 mol %. The solid electrolyte layer had an electric conductivity of 65 S/cm.

EXAMPLE 24

A capacitor device was prepared and evaluated in the same manner as in Example 13 except for using a sodium 2,3-benzofuran-3-sulfonate solution prepared to have the same concentration in place of sodium 4-morpholinepropanesulfonate used in Example 13. The results obtained are shown in Tables 3 and 4. The contents of sulfate ion and 2,3-benzofuran-3-sulfonate ion in the polymer composition were determined according to the method described in Example 13. As a result, the sulfate ion content was 1.9 mol % and the 2,3-benzofuran-3-sulfonate ion content was 15.8 mol %. The solid electrolyte layer had an electric conductivity of 61 S/cm.

COMPARATIVE EXAMPLE 1

A solid electrolytic capacitor was manufactured in the same manner as in Example 13 except for using thiophene in place of 3,4-dioxyethylenethiophene as the monomer compound used in Example 13 and using a solution prepared to have a ferric chloride concentration of 10 wt % in place of APS and a sodium 4-morpholinepropanesulfonate concentration of 0.1 wt %. The capacitor device manufactured was evaluated in the same manner as in Example 13 and the results obtained are shown in Tables 3 and 4.

The 4-morpholinepropanesulfonate ion content in the polymer composition was determined according to the method described in Example 13 and found to be 2.5 mol %. Since sulfate :ion was not contained in combination, the proportion capacitor defective was high.

COMPARATIVE EXAMPLE 2

A dielectric material prepared by the same forming as in Example 13 was dipped in a 12% IPA solution of iron(III) 4-morpholinepropanesulfonate and then dipped in 1.2 mol/l of IPA solution having dissolved therein 5 g of 3,4-dioxyethylene-thiophene. The resulting substrate was left standing in an environment of 60° C. for 10 minutes, thereby completing the oxidation polymerization, and then the substrate was washed with water. This polymerization reaction and the washing each was repeated 10 times. The polymer composition was reduced with hydrazine in a water/IPA solvent and carefully extracted and the 4-morpholinepropanesulfonate ion in the polymer composition was determined by an ion chromatography method. As a result, the 4-morpholinepropanesulfonate ion content was 15 mol % per all repeating structural units of the polymer. The solid electrolyte layer had an electric conductivity of 35 S/cm.

A formed aluminum foil was coated with this electrically conducting polymer composition and a capacitor device was manufactured therefrom. The capacitor device was examined on the sparking voltage and other capacitor properties according to the method described in Example 13. The results obtained are shown in Tables 3 and 4.

COMPARATIVE EXAMPLE 3

A solid electrolytic capacitor was manufactured in the same manner as in Example 13 except for using a solution prepared to have a ferric sulfate concentration of 10 wt % in place of APS used in Example 13 and a sodium 4- orpholinepropanesulfonate ion concentration of 0.1 wt %. The capacitor device manufactured was evaluated and the results obtained are shown in Tables 3 and 4.

The contents of sulfate ion and 4-morpholinepropane-sulfonate ion in the polymer composition were determined according to the method described in Example 13. As a result, the sulfate ion content was 19.6 mol % and the 4-morpholine-propanesulfonate ion content was 31.8 mol %. However, the proportion capacitor defective was high because 8 mol % of iron ion was present and the sulfate ion content exceeded 10 mol %.

In the sparking voltage test of Examples 13 to 24, the voltage was scarcely reduced and the sparking voltage at the completion of reaction was 19 V or less in any case. However, in Comparative Example 3 using iron sulfate, the sparking voltage was greatly reduced due to iron ion remaining at a concentration as high as 8 mol % and due to the decrease in the sparking voltage before the completion of a predetermined reaction, unsatisfactory filling of the solid electrolyte was disadvantageously caused.

REFERENCE EXAMPLE 3

Manufacture of a capacitor device was attempted under the same conditions as in Example 13 except for using thiophene in place of 3,4-dioxyethylenethiophene used in Example 13. However, black blue polythiophene polymer was not produced at all, revealing that occurrence of the oxidation polymerization of thiophenes by APS was peculiar to 3,4-dioxy group-substituted thiophenes.

TABLE 3

Sparking Voltage (unit: V, n = 5)

Number of Polymerization Operations

| | 1 | 2 | 3 | 4 | 5 | 6 | 8 | 10 |
|---|---|---|---|---|---|---|---|---|
| Example 13 | 19 | 19 | 19 | 19 | 19 | 19 | 19 | 19 |
| Example 14 | 19 | 19 | 19 | 19 | 19 | 19 | 19 | 19 |
| Example 15 | 19 | 19 | 19 | 19 | 19 | 19 | 19 | 19 |
| Example 16 | 19 | 19 | 19 | 18 | 17 | 14 | 12 | 10 |
| Example 17 | 19 | 19 | 19 | 19 | 19 | 19 | 19 | 19 |
| Example 18 | 19 | 19 | 19 | 19 | 19 | 19 | 19 | 19 |
| Example 19 | 19 | 19 | 19 | 19 | 19 | 19 | 19 | 19 |
| Example 20 | 19 | 19 | 19 | 19 | 19 | 19 | 19 | 19 |
| Example 21 | 19 | 19 | 19 | 19 | 19 | 19 | 19 | 19 |
| Example 22 | 19 | 19 | 19 | 19 | 19 | 19 | 19 | 19 |
| Example 23 | 19 | 19 | 19 | 19 | 19 | 19 | 19 | 19 |
| Example 24 | 19 | 19 | 19 | 19 | 19 | 19 | 19 | 19 |
| Comparative Example 1 | 18 | 14 | 10 | 3 | | | | |
| Comparative Example 2 | 19 | 16 | 12 | 5 | 2 | | | |
| Comparative Example 3 | 19 | 16 | 12 | 3 | | | | |

TABLE 4

Initial Characteristics

| | C ($\mu$F) | DF (%) | Z (m$\Omega$) | LC ($\mu$A) | Defective/Sample (units/units) | Short Circuit |
|---|---|---|---|---|---|---|
| Example 13 | 8.0 | 0.6 | 60 | 0.02 | 0/30 | 0 |
| Example 14 | 8.2 | 0.7 | 60 | 0.02 | 0/30 | 0 |
| Example 15 | 7.9 | 0.8 | 60 | 0.03 | 0/30 | 0 |
| Example 16 | 7.2 | 0.8 | 60 | 0.03 | 0/30 | 0 |
| Example 17 | 7.0 | 0.9 | 60 | 0.05 | 1/30 | 0 |
| Example 18 | 7.0 | 0.9 | 60 | 0.05 | 1/30 | 0 |
| Example 19 | 4.0 | 1.3 | 60 | 0.09 | 1/30 | 0 |
| Example 20 | 7.9 | 0.8 | 60 | 0.03 | 1/30 | 0 |
| Example 21 | 7.0 | 0.7 | 60 | 0.08 | 1/30 | 0 |
| Example 22 | 7.9 | 0.6 | 60 | 0.03 | 0/30 | 0 |
| Example 23 | 7.9 | 0.7 | 60 | 0.03 | 0/30 | 0 |
| Example 24 | 7.8 | 0.8 | 60 | 0.02 | 0/30 | 0 |
| Comparative Example 1 | 5.8 | 3.2 | 90 | 0.44 | 27/30 | 19 |
| Comparative Example 2 | 7.1 | 1.2 | 60 | 0.16 | 11/30 | 9 |
| Comparative Example 3 | 6.0 | 3.2 | 83 | 0.40 | 14/30 | 10 |

EXAMPLE 25

A formed aluminum foil was processed to have a prescribed area and then subjected to forming at 13 V in an aqueous 10 wt % ammonium adipate solution to prepare a dielectric material on the aluminum foil. The surface of this dielectric material was dipped in an aqueous solution prepared to have an APS concentration of 20 wt % and an ammonium d-camphor sulfonate concentration of 0.2 wt % (Solution 1), and then the dielectric foil was dipped in an IPA solution having dissolved therein 5 g of 3,4-dioxyethylenethiophene (Solution 2). The resulting substrate was taken out and left standing in an environment at 60° C. for 10 minutes, thereby completing the oxidative polymerization, and then the substrate was washed with water. This polymerization reaction and the washing each was repeated 10 times. The polymerization product was reduced with hydrazine in a water/IPA solvent and then carefully extracted and the contents of sulfate ion and d-camphor sulfonate ion in the polymerization product were determined by an Ion chromatography method. As a result, the sulfate ion content was 1.5 mol % and the d-camphor sulfonate ion content was 17 mol %, per all the repeating structural units of the polymer. The solid electrolyte layer had an electric conductivity of 70 S/cm.

Then, the aluminum core part was welded with a plus side lead for collecting the current from the anode and on the other hand, connected to the minus side lead through carbon paste and silver paste for collecting the current from the cathode. These elements were finally sealed by an epoxy resin to manufacture a capacitor device. The capacitor device manufactured was aged at 125° C. for 2 hours and then subjected to the initial evaluation. The results obtained are shown together in Table 5. In the Table 5, C indicates a capacitance and DF indicates a tangent of the loss angle (tan $\delta$). These were each measured at 120 Hz. The impedance is shown by a value at a resonance frequency. LC (leakage current) was measured one minute after a rated voltage was applied. The measured values each is an average of 30 samples. With respect to LC, those having an LC of 1 $\mu$A or more were judged as a defective and the average LC value was calculated exclusive of the defective units. The results obtained in moisture resistance performance tests are shown in Table 6. Here, with respect to LC, those having an LC of 10 $\mu$A or more were judged as a shorted product and treated in the same manner as in the case of initial value. The moisture resistance performance tests were carried out by leaving the capacitor device to stand under high temperature and high humidity conditions of 85° C. and 85% RH for 500 hours.

EXAMPLE 26

A capacitor device was prepared and evaluated in the same manner as in Example 25 except for using a solution of ammonium 2-camphor sulfonate prepared to have the same concentration in place of ammonium d-camphor sulfonate used in Example 25. The results obtained are shown in Tables 5 and 6. The contents of sulfate ion and 2-camphor sulfonate ion in the polymerization product were determined according to the method described in Example 25. As a result, the sulfate ion content was 1.9 mol % and the 2-camphor sulfonate ion content was 14 mol %. The solid electrolyte layer had an electric conductivity of 45 S/cm.

EXAMPLE 27

A capacitor device was prepared and evaluated in the same manner as in Example 25 except for using a solution of sodium d-camphor carbonate in place of ammonium d-camphor sulfonate used in Example 25. The results obtained are shown in Tables 5 and 6. The contents of sulfate ion and d-camphor carbonate ion in the polymerization product were determined according to the method described in Example 1 As a result, the sulfate ion content was 4.7 mol % and the d-camphor carbonate ion content was 4.3 mol %. The solid electrolyte layer had an electric conductivity of 10 S/cm.

EXAMPLE 28

A capacitor device was prepared and evaluated in the same manner as in Example 25 except for using potassium persulfonate and N-methylpyrrole in place of APS and 3,4-dioxyethylene-thiophene, respectively, used in Example 1. The results obtained are shown in Tables 5 and 6. The contents of sulfate ion and d-camphor sulfonate ion in the polymerization product were determined according to the method described in Example 1. As a result, the sulfate ion content was 6.8 mol % and the d-camphor sulfonate ion content was 11 mol %. The solid electrolyte layer had an electric conductivity of 20 S/cm.

EXAMPLE 29

A capacitor device was prepared and evaluated in the same manner as in Example 25 except for using the following method in place of the production method for conducting polymer composition used in Example 25. The results obtained are shown in Tables 5 and 6. That is, a dielectric material was prepared in the same manner as in Example 25 and the surface of this dielectric material was impregnated with an dioxane solution prepared to have an 2,3-dichloro-5,6-dicyanobenzoquione (hereafter, abbreviated DDQ) concentration of 10 wt % and an ammonium d-camphor sulfonate concentration of 0.1 wt % (Solution 1), and then the dielectric foil was dipped in an IPA solution having dissolved therein 5 g of isothianaphthene (Solution 2). The resulting substrate was taken out and left standing in an environment at 80° C. for 30 minutes, thereby completing the oxidative polymerization, and then the substrate was washed with dioxane and water. This polymerization reaction and the washing each was repeated 10 times. The polymerization product was reduced with hydrazine in a water/IPA solvent and then carefully extracted and the contents of d-camphor sulfonate ion in the polymerization product were determined by an ion chromatography method. As a result, the d-camphor sulfonate ion content was 11.5 mol %, per all the repeating structural units of the polymer. The solid electrolyte layer had an electric conductivity of 18 S/cm.

EXAMPLE 30

A capacitor device was prepared and evaluated in the same manner as in Example 25 except for using a solution of ferric sulfate prepared to a concentration of 10 wt % in place of APS used in Example 25. The results obtained are shown in Tables 5 and 6. The contents of sulfate ion and d-camphor sulfonate ion in the polymerization product were determined according to the method described in Example 25. As a result, the sulfate ion content was 23 mol % and the d-camphor sulfonate ion content was 14 mol %. However, the existence of 11 wt % of iron element resulted in poor capacitor characteristics.

EXAMPLE 31

A capacitor device was prepared and evaluated in the same manner as in Example 25 except for using a solution prepared to have a ferric chloride concentration of 10 wt % in place of APS and a sodium d-camphor sulfonate concentration of 0.1 wt %. The results obtained are shown in Tables 5 and 6. The contents of d-camphor sulfonate ion in the polymerization product were determined according to the method described in Example 25 and found to be 2.3 mol %. Since sulfate ion was not contained in combination, the capacitor properties were poor.

TABLE 5

| | Initial Characteristics | | | | | |
|---|---|---|---|---|---|---|
| | C (μF) | DF (%) | Z (mΩ) | LC (μA) | Defective/Sample (units/units) | Short Circuit |
| Example 25 | 5.2 | 0.8 | 26 | 0.04 | 0/30 | 0 |
| Example 26 | 5.3 | 0.9 | 24 | 0.04 | 0/30 | 0 |
| Example 27 | 5.0 | 1.0 | 32 | 0.05 | 1/30 | 0 |
| Example 28 | 4.8 | 1.1 | 40 | 0.06 | 2/30 | 0 |
| Example 29 | 4.7 | 1.2 | 50 | 0.08 | 2/30 | 0 |
| Example 30 | 5.4 | 0.6 | 25 | 0.08 | 1/30 | 0 |
| Example 31 | 4.5 | 1.4 | 52 | 0.05 | 2/30 | 0 |

TABLE 6

| | Reflow Test | | moisture resistance test | | |
|---|---|---|---|---|---|
| | Defective/Sample (units/units) | Short Circuit | LC | Proportion of Defective (defective/sample) | Short Circuit |
| Example 25 | 0/30 | 0 | 0.14 | 0/30 | 0 |
| Example 26 | 0/30 | 0 | 0.16 | 0/30 | 0 |
| Example 27 | 0/29 | 0 | 0.20 | 0/29 | 0 |
| Example 28 | 2/28 | 0 | 0.25 | 1/26 | 0 |
| Example 29 | 1/28 | 0 | 0.30 | 1/27 | 1 |
| Example 30 | 2/29 | 0 | 0.35 | 0/27 | 0 |
| Example 31 | 2/28 | 0 | 0.84 | 2/26 | 2 |

EXAMPLE 32

With respect of aluminum foil having formed thereon a solid electrolyte consisting of an electrically conducting polymer composition which was prepared by the method described in Example 1 to 10, 13 to 24 and 25 to 31, a scanning electron micrograph of the cross sectional surface of each foil was examined. It is confirmed that, in the all or most of the foils, the electrically conducting polymer covers in the form of a lamellar structure the surface inside the microfine pores of dielectric material and an interstitial space exist in the lamellar electrically conducting polymer layer. For example, a micrograph of a cross-section observed in Example 1 is shown in FIG. 1. The thickness of the electrically conducting polymer layer formed on the outside surface of the microfine pore structure is about 5 μm and the thickness per unit layer which constitutes the lamellar structure is in the range of about 0.1 to 0.5 μm. Furthermore, it revealed that although the electrically conducting polymer covers the entire surface inside the microfine pores, there exist voids even in these covered portions.

INDUSTRIAL APPLICABILITY

As described in the foregoing, the solid electrolytic capacitor of the present invention comprises a solid electrolyte containing an electrically conducting polymer having a π electron-conjugated structure, wherein the solid electrolyte contains as a dopant at least one organic anion selected from (1) an alkoxy-substituted naphthalene monosulfonate anion, (2) a sulfonate anion of a heterocyclic compound, and (3) an anion of an aliphatic polycyclic compound or a combination of it with another anion having a dopant ability, so that a compact and high-performance solid electrolytic capacitor favored with low-impedance and/or excellent sparking voltage proof properties as well as a production method thereof can be provided.

Furthermore, the solid electrolytic capacitor of the present invention comprises a solid electrolyte using a specific polyheterocyclic compound, particularly an electrically conducting polythiophene substituted by a dioxymethylene group, whereby there are provided effects such that the voltage proof property (a sparking voltage test), high frequency property, tan δ, impedance property, leakage current, heat resistance (reflow property) and the like are greatly improved. In particular, the above-described electrically conducting polymer has a content of the above-described organic anion of from 0.1 to 50 mol % and a sulfate ion content of from 0.1 to 10 mol %, therefore, a solid electrolytic capacitor having high-performance capacitor properties can be provided.

What is claimed is:

1. A method for producing a solid electrolytic capacitor comprising an oxide dielectric film having provided thereon an electrically conducting polymer composition layer, the method comprising polymerizing a polymerizable monomer compound on an oxide dielectric film by an oxidizing agent, wherein the polymerizable monomer compound is a compound represented by the following general formula (III):

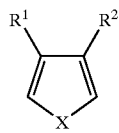
(III)

wherein $R^1$ and $R^2$ each independently represents any one monovalent group selected from hydrogen, a linear or branched, saturated or unsaturated alkyl group having from 1 to 6 carbon atoms, a linear or branched, saturated or unsaturated alkoxy group having from 1 to 6 carbon atoms, a hydroxyl group, a halogen atom, a nitro group, a cyano group, a trihalomethyl group, a phenyl group and a substituted phenyl group, $R^1$ and $R^2$ may be combined to each other at any position to form at least one divalent chain for forming at least one 5-, 6- or 7-membered saturated or unsaturated ring structure, and X represents a hetero atom selected from S, O, Se, Te or $NR^3$, $R^3$ represents hydrogen, a linear or branched, saturated or unsaturated alkyl group having form 1 to 6 carbon atoms, a phenyl group or a linear or branched, saturated or unsaturated alkoxy group having from 1 to 6 carbon atoms, the alkyl group and the alkoxy group represented by $R^1$, $R^2$ or $R^3$ may optionally contain in the chain thereof a carbonyl bond, an ether bond, an ester bond, an amide bond or an imino bond, and the polymerization reaction takes place in the presence of a compound capable of providing at least one organic anion selected from (1) an alkoxy-substituted naphthalene monosulfonate anion substituted by at least one linear or branched, saturated or unsaturated alkoxy group having from 1 to 12 carbon atoms, (2) a sulfonate anion of a heterocyclic compound having a 5- or 6-membered heterocyclic ring, and (3) an anion of an aliphatic polycyclic compound.

2. The method for producing a solid electrolytic capacitor as claimed in claim 1, wherein the polymerizable monomer compound represented by formula (III) is a compound represented by the following general formula (IV):

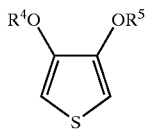
(IV)

wherein $R^4$ and $R^5$ each independently represents hydrogen, a linear or branched, saturated or unsaturated alkyl group having from 1 to 6 carbon atoms, or a substituent for forming at least one 5-, 6- or 7-membered heterocyclic structure containing the two oxygen elements shown in the formula by combining the linear or branched, saturated or unsaturated alkyl groups having from 1 to 6 carbon atoms to each other at any position.

3. The method for producing a solid electrolytic capacitor as claimed in claim 1 or 2, wherein said method comprises a step of dipping a valve-acting metal anode foil having formed thereon an oxide dielectric film layer in a solution containing a polymerizable monomer compound and a step of dipping the metal anode foil in a solution containing an oxidizing agent and above-described organic anion.

4. The method for producing a solid electrolytic capacitor as claimed in claim 1 or 2, wherein said method comprises a step of dipping a valve-acting metal anode foil having formed thereon an oxide dielectric film layer in a solution containing an oxidizing agent and a step of dipping the metal anode foil in a solution containing a polymerizable monomer compound and above-described organic anion.

5. The method for producing a solid electrolytic capacitor as claimed in claim 1 or 2, wherein said method comprises a step of dipping a valve-acting metal anode foil having formed thereon an oxide dielectric film layer in a solution containing an oxidizing agent and then a step of dipping the metal anode foil in a solution containing a polymerizable monomer compound and above-described organic anion.

6. The method for producing a solid electrolytic capacitor as claimed in claim 1 or 2, wherein said method comprises a step of dipping a valve-acting metal anode foil having formed thereon an oxide dielectric film layer in a solution containing a polymerizable monomer compound and then a step of dipping the metal anode foil in a solution containing an oxidizing agent and above-described organic anion.

7. The method for producing a solid electrolytic capacitor as claimed in claim 1 or 2, wherein said method comprises a step of dipping a valve-acting metal anode foil having formed thereon an oxide dielectric film layer in a solution containing an oxidizing agent and above-described organic anion and then a step of dipping the metal anode foil in a solution containing a polymerizable monomer compound.

8. The method for producing a solid electrolytic capacitor as. claimed in claim 1 or 2, wherein said method comprises a step of dipping a valve-acting metal anode foil having formed thereon an oxide dielectric film layer in a solution containing a polymerizable monomer compound and above-described organic anion and then a step of dipping the metal anode foil in a solution containing an oxidizing agent.

9. The method for producing a solid electrolytic capacitor as claimed in claim 1 or 2, wherein said method comprises a step of repeating multiple times a process of dipping a valve-acting metal anode foil having formed thereon an oxide dielectric film layer in a solution containing an oxidizing agent and above-described organic anion and then a process of dipping the metal anode foil in a solution containing a polymerizable monomer compound.

10. The method for producing a solid electrolytic capacitor as claimed in claim 1 or 2, wherein said method comprises a step of repeating multiple times a process of dipping a valve-acting metal anode foil having formed thereon an oxide dielectric film layer in a solution containing a polymerizable monomer compound and above-described organic anion and then a process of dipping the metal anode foil in a solution containing an oxidizing agent.

11. The method for producing a solid electrolytic capacitor as claimed in claim 1 or 2, wherein said method comprises a step of repeating multiple times a process of dipping a valve-acting metal anode foil having formed thereon an oxide dielectric film layer in a solution containing an oxidizing agent and then a process of dipping the metal anode foil in a solution containing a polymerizable monomer compound and above-described organic anion.

12. The method for producing a solid electrolytic capacitor as claimed in claim 1 or 2, wherein said method comprises a step of repeating multiple times a process of dipping a valve-acting metal anode foil having formed thereon an oxide dielectric film layer in a solution containing a polymerizable monomer compound and then a process of dipping the metal anode foil in a solution containing an oxidizing agent and above-described organic anion.

13. The method for producing a solid electrolytic capacitor as claimed in claim 1 or 2, wherein said method comprises a step of repeating multiple times a process of dipping a valve-acting metal anode foil having formed thereon an oxide dielectric film layer in a solution containing an oxidizing agent and above-described organic anion and then a process of dipping the metal anode foil in a solution containing a polymerizable monomer compound, followed by a step of washing and drying the metal anode foil.

14. The method for producing a solid electrolytic capacitor as claimed in claim 1 or 2, wherein said method comprises a step of repeating multiple times a process of dipping a valve-acting metal anode foil having formed thereon an oxide dielectric film layer in a solution containing a polymerizable monomer compound and above-described organic anion and then a process of dipping the metal anode foil in a solution containing an oxidizing agent, followed by a step of washing and drying the metal anode foil.

15. The method for producing a solid electrolytic capacitor as claimed in claim 1 or 2, wherein said method comprises a step of repeating multiple times a process of dipping a valve-acting metal anode foil having formed thereon an oxide dielectric film layer in a solution containing an oxidizing agent and then a process of dipping the metal anode foil in a solution containing a polymerizable monomer compound and above-described organic anion, followed by a step of washing and drying the metal anode foil.

16. The method for producing a solid electrolytic capacitor as claimed in claim 1 or 2, wherein said method comprises a step of repeating multiple times a process of dipping a valve-acting metal anode foil having formed thereon an oxide dielectric film layer in a solution containing a polymerizable monomer compound and then a process of dipping the metal anode foil in a solution containing an oxidizing agent and above-described organic anion, followed by a step of washing and drying the metal anode foil.

17. The method for producing a solid electrolytic capacitor as claimed in claim 1 or 2, wherein the organic anion is an alkoxy-substituted naphthalene monosulfonate anion substituted by at least one linear or branched, saturated or unsaturated alkoxy group having from 1 to 12 carbon atoms.

18. The method for producing a solid electrolytic capacitor as claimed in claim 17, wherein at least one hydrogen on an aromatic ring of the alkoxy-substituted naphthalene monosulfonate anion is substituted by a substituent selected from a halogen atom, a nitro group, a cyano group, and a trihalomethyl group.

19. The method for producing a solid electrolytic capacitor as claimed in claim 1 or 2, wherein the organic anion is a heterocyclic sulfonate anion.

20. The method for producing a solid electrolytic capacitor as claimed in claim 19, wherein the heterocyclic sulfonate anion is an anion having at least one heterocyclic skeleton selected from the group consisting of compounds containing a chemical structure of morpholine, piperidine, piperazine, imidazole, furan, 1,4-dioxane, benzimidazole, benzothiazolylthio, benzisoxazole, benzotriazole or benzofuran.

21. The method for producing a solid electrolytic capacitor as claimed in claim 19, wherein the heterocyclic sulfonate anion contains at least one alkylsulfonate substituent in the chemical structure thereof.

22. The method for producing solid electrolytic capacitor as claimed in claim 1 or 2, wherein the organic anion as a dopant is an anion of an aliphatic polycyclic compound.

23. The method for producing a solid electrolytic capacitor as claimed in claim 1 or 2, wherein the oxidizing agent is a persulfate.

24. The method for producing a solid electrolytic capacitor as claimed in claim 2, wherein the 5-, 6- or 7-membered heterocylic structure containing the two oxygen elements shown in formula (IV) is a substituted vinylene group or a substituted o-phenylene group.

* * * * *